US012298709B2

(12) United States Patent
Akiyama et al.

(10) Patent No.: US 12,298,709 B2
(45) Date of Patent: May 13, 2025

(54) TONER AND METHOD FOR PRODUCING TONER

(71) Applicant: CANON KABUSHIKI KAISHA, Tokyo (JP)

(72) Inventors: Hiroki Akiyama, Shizuoka (JP); Shuntaro Watanabe, Kanagawa (JP); Hiroki Kagawa, Shizuoka (JP); Shuhei Moribe, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 615 days.

(21) Appl. No.: 17/493,191

(22) Filed: Oct. 4, 2021

(65) Prior Publication Data

US 2022/0107573 A1 Apr. 7, 2022

(30) Foreign Application Priority Data

Oct. 5, 2020 (JP) ................................ 2020-168583

(51) Int. Cl.
*G03G 9/087* (2006.01)

(52) U.S. Cl.
CPC ..... *G03G 9/08728* (2013.01); *G03G 9/08755* (2013.01)

(58) Field of Classification Search
None
See application file for complete search history.

(56) References Cited

U.S. PATENT DOCUMENTS 7,846,630 B2 12/2010 Murakami
2007/0269733 A1* 11/2007 Ohta .................. G03G 9/08797 430/31
2015/0037718 A1* 2/2015 Morita ................. G03G 9/0825 430/105
2015/0220011 A1* 8/2015 Miyaake ............. G03G 9/0819 430/105
2017/0336726 A1* 11/2017 Hasegawa ............ G03G 9/0926
2018/0348655 A1 12/2018 Yamauchi
2020/0310271 A1* 10/2020 Sakamoto .......... G03G 15/0865

FOREIGN PATENT DOCUMENTS

CN 104885016 A 9/2015
JP 2014130243 A 7/2014
JP 2014142632 A 8/2014
JP 2018004781 A 1/2018
JP 2020160202 A 10/2020
WO 2019/073731 A1 4/2019
WO WO-2019225207 A1 * 11/2019 ............ C08F 212/08

OTHER PUBLICATIONS

Bouzouita, Amani. (2016). Elaboration of polylactide-based materials for automotive application : study of structure-process-properties interactions. (Year: 2016).*
WO-2019225207-A1 Translation (Year: 2024).*
Polymer Handbook, 1999, Wiley-Interscience, Fourth Edition, p. 692 (Year: 1999).*

* cited by examiner

*Primary Examiner* — Peter L Vajda
*Assistant Examiner* — Charles Collins Sullivan, IV
(74) *Attorney, Agent, or Firm* — Canon U.S.A., Inc. IP DIvision

(57) ABSTRACT

A toner includes a toner particle containing a resin component including a crystalline resin and an amorphous resin. In a cross-sectional observation of the toner particle, a domain-matrix structure which comprises a matrix containing the crystalline resin and domains containing the amorphous resin is observed. The maximum endothermic peak temperature Tm of the toner determined by DSC is 50° C. to 80° C. When the storage elastic modulus of the toner at a temperature 5° C. lower than Tm is G'(−5) (Pa), and the storage elastic modulus of the toner at a temperature 5° C. higher than Tm is G'(+5) (Pa), G'(−5) and G'(+5) satisfy inequality (1), and when the maximum loss tangent of the toner in a temperature range of from 50° C. to 130° C. is tan δ (Max), tan δ (Max) satisfies inequality (2).

11 Claims, No Drawings

TONER AND METHOD FOR PRODUCING TONER

BACKGROUND

The present disclosure relates to a toner used in an electrophotographic image forming apparatus.

DESCRIPTION OF THE RELATED ART

There has recently been an increasing demand for energy-saving measures for electrophotographic image forming apparatuses. As such energy-saving measures, techniques of fixing a toner at a low temperature in order to reduce power consumption during a fixing process have been studied.

To improve the low-temperature fixability of a toner, the glass transition point of a binder resin of the toner may be decreased, for example. However, since decreasing the glass transition point of the binder resin leads to reducing the heat-resistant storage stability of the toner, it is difficult to achieve both the low-temperature fixability and the heat-resistant storage stability of the toner by this method.

Accordingly, it has been studied to use a crystalline resin for a toner in order to achieve both the low-temperature fixability and the heat-resistant storage stability of the toner. Amorphous resins commonly used as binder resins for toners exhibit no distinct endothermic peaks in differential scanning calorimetry (DSC). In contrast, crystalline resins exhibit endothermic peaks in DSC. Due to an intramolecular or intermolecular orderly arrangement of alkyl groups, a crystalline resin has the property of being hardly softened until reaching its melting point. Having this property, the crystalline resin undergoes sudden melting (sharp melting) of crystals upon reaching the melting point, and experiences a sudden decrease in viscosity associated therewith.

Crystalline vinyl resins are known as materials that have high sharp melting properties and provide toners having both low-temperature fixability and heat-resistant storage stability. Crystalline vinyl resins are vinyl polymers containing a monomer unit having a long-chain alkyl group. That is, a crystalline vinyl resin has a main-chain backbone and a pendant long-chain alkyl group. The resin exhibits crystallinity as a result of crystallization caused by an orderly arrangement of pendant long-chain alkyl groups.

Japanese Patent Laid-Open No. 2014-130243 proposes a toner that contains a side-chain crystalline resin, that is, a crystalline vinyl resin, as a core for the purpose of having improved low-temperature fixability.

However, the present inventors have conducted intensive studies on the toner disclosed in Japanese Patent Laid-Open No. 2014-130243 and found that the toner is sometimes likely to soil a fixing device.

SUMMARY

At least one aspect of the present disclosure is directed to providing a toner that can have high low-temperature fixability and is less likely to soil a fixing device.

According to one aspect of the present disclosure, there is provided a toner including a toner particle containing a resin component including a crystalline resin and an amorphous resin. In a cross-sectional observation of the toner particle, a domain-matrix structure which comprises a matrix containing the crystalline resin and domains containing the amorphous resin is observed. The maximum endothermic peak temperature Tm (° C.) of the toner determined by differential scanning calorimetry (DSC) is 50° C. to 80° C. G'(−5) and G'(+5) satisfy inequality (1): G'(−5)/G'(+5)≥50 . . . (1) where G'(−5) (Pa) is a storage elastic modulus of the toner at a temperature 5° C. lower than Tm (° C.), and G'(+5) (Pa) is a storage elastic modulus of the toner at a temperature 5° C. higher than Tm (° C.). Tan δ (Max) satisfies inequality (2): 0.0≤tan δ (Max)≤1.50 . . . (2) where tan δ (Max) is a maximum loss tangent of the toner in a temperature range of from 50° C. to 130° C.

According to the present disclosure, a toner that can have high low-temperature fixability and is less likely to soil a fixing device can be provided.

Further features of the present disclosure will become apparent from the following description of exemplary embodiments.

DESCRIPTION OF THE EMBODIMENTS

The phrases "XX or more and YY or less" and "XX to YY" representing numerical ranges each mean a numerical range including its endpoints, that is, the lower limit and the upper limit, unless otherwise specified.

The term "(meth)acrylate" means acrylate and/or methacrylate, and the term "(meth)acrylic acid" means acrylic acid and/or methacrylic acid.

When numerical ranges are described in stages, the upper limit of each numerical range may be combined with the lower limit of any other numerical range.

The term "monomer unit" means a unit constituting a polymer and refers to a reacted form of a monomer (polymerizable monomer). For example, one section from one carbon-carbon bond to another in a main chain composed of polymerized vinyl monomers in a polymer is one monomer unit. A vinyl monomer can be represented by formula (Z) below, and a vinyl monomer unit is a structural unit of a polymer, or a reacted form of the monomer represented by formula (Z) below. A monomer unit may also be referred to simply as a "unit".

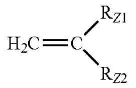

(Z)

(In formula (Z), $R_{Z1}$ represents a hydrogen atom or an alkyl group, and $R_{Z2}$ represents a substituent.)

The term "crystalline resin" refers to a resin that exhibits a distinct endothermic peak in differential scanning calorimetry (DSC) using the resin, toner particles, or a toner as a measurement sample (differential scanning calorimetry is also referred to as DSC).

In a cross-sectional observation of a toner particle, a segment containing a crystalline resin refers to a segment determined to be at 127 or lower grayscale level by image analysis of a toner cross-section subjected to ruthenium staining described below. In the image analysis, the brightness variation from black to white is represented by 0 to 255 grayscale levels. Likewise, a segment containing an amorphous resin refers to a segment at 128 or higher grayscale level. That is, when binarization that converts segments at 127 or lower grayscale level to be black and converts segments at 128 or higher grayscale level to be white is performed, a segment composed mainly of a crystalline resin is a segment represented by black, and a segment composed mainly of an amorphous resin is a segment represented by white.

The present inventors have conducted intensive studies and found that a toner having the above constituent features tends to be a toner that can have high low-temperature fixability and is less likely to soil a fixing device. A presumed mechanism and the constituent features will be described below in detail.

Mechanism by which advantageous effects of present disclosure are produced

The present inventors presume that the mechanism by which the advantageous effects of the present disclosure are produced is as follows.

When a matrix containing a crystalline resin is observed in a cross-sectional observation of a toner particle, it means that the physical properties of the toner are likely to depend on the crystalline resin, and high low-temperature fixability is provided. When domains containing an amorphous resin are observed, high elasticity is readily provided by the amorphous resin without compromising the low-temperature fixability provided by the crystalline resin, and thus the toner tends to be less likely to soil a fixing device.

When the maximum endothermic peak temperature Tm of the toner determined by DSC is a sufficiently low temperature range of from 50° C. to 80° C., the resin contained in the toner is readily plasticized at low temperature, and high low-temperature fixability is provided. When the ratio of a storage elastic modulus at a temperature 5° C. lower than the endothermic peak temperature with respect to a storage elastic modulus at a temperature 5° C. higher than the endothermic peak temperature is 50.0 or more, the toner suddenly melts at or near the endothermic peak temperature, and thus the toner has high low-temperature fixability.

Furthermore, when tan δ (Max), a maximum loss tangent of the toner in a range of from 50° C. to 130° C., is 1.50 or less, the viscosity of the toner will not be excessively high in this temperature range, and thus the toner is less likely to soil a fixing device.

Domain-Matrix Structure

In a cross-sectional observation of the toner particle, a domain-matrix structure which comprises a matrix containing a crystalline resin and domains containing an amorphous resin is observed.

Due to the presence of the crystalline resin in the matrix, the physical properties of the toner are likely to depend on the crystalline resin, and thus the toner tends to have improved crystallinity and high low-temperature fixability. Due to the presence of the amorphous resin in the domains, high elasticity is provided without compromising the low-temperature fixability of the toner, and thus the toner tends to have high high-temperature offset resistance and durability and is less likely to soil a fixing device.

Preferably, a domain-matrix structure which comprises a matrix composed mainly of a crystalline resin and domains composed mainly of an amorphous resin is observed.

In the present disclosure, whether the matrix and the domains each contain a crystalline resin or an amorphous resin and whether the matrix and the domains each contain a crystalline resin or an amorphous resin are determined in a manner similar to the above-described method using a binarized image.

The domain-matrix structure as described above can be obtained by controlling the quantity ratio and viscosity ratio of the crystalline resin and the amorphous resin used in producing the toner.

The domain-matrix structure as described above can be obtained by controlling the quantity ratio and viscosity ratio of the crystalline resin and the amorphous resin used in producing the resin component.

The domain according to the present disclosure refers to a domain having a domain size of 0.001 μm or more.

Maximum Endothermic Peak Temperature (Tm)

In the present disclosure, a maximum endothermic peak temperature Tm (° C.) of the toner determined by DSC is 50° C. to 80° C. The maximum endothermic peak temperature Tm in this range can be achieved, for example, by incorporating a vinyl polymer A described later in the toner.

A maximum endothermic peak of the toner determined by DSC means an endothermic peak of a component that absorbs heat and melts most in the toner, that is, an endothermic peak of a component that contributes most to melting of the toner.

When Tm is 50° C. or higher, it means that the melting temperature of the component that contributes most to melting of the toner is not excessively low, and the resin component of the toner is not readily plasticized until the temperature at which the melting starts is reached, thus providing high heat-resistant storage stability. For this reason, Tm is 50° C. or higher, preferably 55° C. or higher. When Tm is 80° C. or lower, it means that the component that contributes most to melting of the toner melts at a sufficiently low temperature, and the resin component of the toner is readily plasticized due to the melting, thus providing high low-temperature fixability. For this reason, Tm is 80° C. or lower, preferably 75° C. or lower.

The maximum endothermic peak is preferably an endothermic peak attributed to melting of the resin component.

Storage Elastic Modulus (G'(−5) and G'(+5))

The toner of the present disclosure is a toner in which G'(−5) and G'(+5) satisfies inequality (1): $G'(-5)/G'(+5) \geq 50$ . . . (1) where G'(−5) (Pa) is a storage elastic modulus of the toner at a temperature 5° C. lower than Tm (° C.), and G'(+5) (Pa) is a storage elastic modulus of the toner at a temperature 5° C. higher than Tm (° C.). When inequality (1) is satisfied, the toner suddenly melts at or near Tm and tends to have high low-temperature fixability. Thus, inequality (1) is preferably satisfied. The toner more preferably satisfies formula (5): $G'(-5)/G'(+5) \geq 150$ . . . (5).

For the upper limit, inequality (8) below is preferably satisfied.

$$G'(-5)/G'(+5) \leq 2000 \qquad (8)$$

G'(+5) is preferably $1.00 \times 10^4$ to $1.00 \times 10^6$ Pa. When G'(+5) is in this range, both high low-temperature fixability and heat-resistant storage stability can be achieved. Tm, G'(−5), and G'(+5) can be controlled by the choice of the composition, content, etc. of the crystalline resin used in the production of the toner.

The toner satisfying inequalities (1), (5), and (8) above can be achieved, for example, by incorporating the vinyl polymer A described later in the toner.

Loss Tangent (tan δ)

The toner of the present disclosure satisfies $0.0 \leq \tan\delta\ (\text{Max}) \leq 1.50$ where tan δ (Max) is a maximum loss tangent of the toner in a temperature range of from 50° C. to 130° C. The loss tangent (tan δ) of the toner is a value of loss elastic modulus/storage elastic modulus of the toner and indicates how much energy is dissipated as heat when stress is applied to the toner and the toner is deformed. Therefore, the higher the frictional resistance occurring at the interface between the domain and the matrix described above, the more the heat energy due to the frictional resistance is dissipated when stress is applied, thus resulting in a higher loss elastic modulus and a higher loss tangent. It is known that the toner behaves in a more elastic manner when having a lower tan δ and behaves in a more viscous manner when having a higher tan δ, which means that the higher the tan δ of the toner, the higher the viscosity of the toner, and the more the toner is likely to soil a fixing device. The present inventors have conducted intensive studies and found that if the value of tan δ (Max) is 0.0 to 1.50 in a temperature range of from 50° C. to 130° C., the toner is kept sufficiently elastic and kept from becoming excessively viscous in this temperature range, and thus the toner is less likely to soil a fixing device. More preferably, the toner satisfies 0.0≤tan δ (Max) ≤0.98. The value of tan δ (Max) can be controlled by the choice of the composition and amount of the crystalline resin used in the production of the toner or by the choice of the mixing ratio of the crystalline resin and the amorphous resin, the type and amount of radical initiator, etc. in the production of the resin component.

The mechanism by which the loss tangent (tan δ) is controlled and the effects produced thereby are presumably as follows. When a domain-matrix structure is formed in the toner particle, frictional resistance occurs at the interface between the domain and the matrix. As the difference in polarity between the two increases, the frictional resistance at the interface increases, which increases the loss elastic modulus of the toner. The increase in loss elastic modulus of the toner increases tan δ, thus increasing the viscosity of the toner, and as a result, the toner becomes likely to soil a fixing device. That is, control of the affinity at the interface between the domain and the matrix enables control of frictional resistance, loss elastic modulus, and tan δ, and thus the toner becomes less likely to soil a fixing device.

The control of the affinity at the interface between the domain and the matrix to control the loss tangent to be in the above range can be achieved, for example, by introducing a monomer unit B having a highly polar and highly acidic proton in the vinyl polymer A described later.

Resin Component

The resin component includes a crystalline resin and an amorphous resin. Due to the presence of the crystalline resin in the resin component, the toner tends to have high low-temperature fixability. Due to the presence of the amorphous resin, high elasticity is readily provided, and the toner tends to be less likely to soil a fixing device. That is, the resin component includes the crystalline resin and the amorphous resin.

The resin component in the present disclosure is preferably a binder resin. That is, the toner preferably includes a toner particle containing a binder resin including a crystalline resin and an amorphous resin.

The resin component is preferably a resin produced by mixing a crystalline resin and an amorphous resin. More preferably, the resin component is a resin produced by mixing a crystalline vinyl resin and an amorphous polyester.

Preferably, the resin component contains tetrahydrofuran soluble matter, and the tetrahydrofuran soluble matter contains a crystalline resin. When the resin component contains the crystalline resin soluble in tetrahydrofuran (hereinafter also referred to as THF), the elasticity of the toner will not be excessively high, and high low-temperature fixability and high high-temperature offset resistance are readily provided. The crystalline resin soluble in THF can be incorporated into the resin component of the toner by using the crystalline resin in the resin production. For easy control of the elasticity of the toner, the THF soluble matter may contain an amorphous resin.

The crystalline resin contained in the THF soluble matter may be a single crystalline resin or a combination of two or more crystalline resins.

Vinyl Polymer A and Monomer Unit A

The crystalline resin is preferably a vinyl polymer A containing a monomer unit A represented by formula (A) below. When the toner contains the vinyl polymer A, both high low-temperature fixability and heat-resistant storage stability are readily achieved. This is probably because gathering of long-chain alkyl groups represented by $R^2$ helps provide a resin component having high crystallinity. To incorporate the vinyl polymer A in the toner, the crystalline resin used in the resin production is preferably the vinyl polymer A. The vinyl polymer A is preferably a resin soluble in THF.

(A)

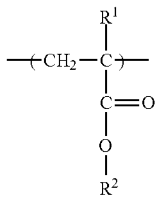

(In formula (A), $R^1$ represents H or $CH_3$, and $R^2$ represents an alkyl group having 18 to 36 carbon atoms.)

The vinyl polymer A containing the monomer unit A can be incorporated as a monomer unit of the vinyl polymer A by performing vinyl polymerization using a (meth)acrylic acid ester having an alkyl group having 18 to 36 carbon atoms as a polymerizable monomer (hereinafter also referred to as a polymerizable monomer A).

The polymerizable monomer A is a (meth)acrylate having a chain hydrocarbon group having 18 to 36 carbon atoms.

Examples of the chain hydrocarbon group having 18 to 36 carbon atoms include chain unsaturated hydrocarbon groups having 18 to 36 carbon atoms and chain saturated hydrocarbon groups having 18 to 36 carbon atoms (hereinafter a chain saturated hydrocarbon group is also referred to as an alkyl group). The (meth)acrylate having a chain hydrocarbon group having 18 to 36 carbon atoms is preferably a (meth)acrylate having an alkyl group having 18 to 36 carbon atoms.

Examples of the (meth)acrylate having an alkyl group having 18 to 36 carbon atoms include (meth)acrylates having a linear alkyl group having 18 to 36 carbon atoms [e.g., octadecyl (meth)acrylate, nonadecyl (meth)acrylate, eicosyl (meth)acrylate, heneicosanyl (meth)acrylate, behenyl (meth)acrylate, lignoceryl (meth)acrylate, ceryl (meth)acrylate, montanyl (meth)acrylate, myricyl (meth)acrylate, and dotriacontyl (meth)acrylate] and (meth)acrylates having a branched alkyl group having 18 to 36 carbon atoms [e.g., 2-decyltetradecyl (meth)acrylate].

Of these, from the viewpoint of improvement in storage stability, low-temperature fixability, and high-temperature offset resistance of the toner, (meth)acrylates having an alkyl group having 18 to 34 carbon atoms are preferred, and (meth)acrylates having an alkyl group having 18 to 30 carbon atoms are more preferred. Still more preferred is at least one selected from the group consisting of stearyl (meth)acrylate, octadecyl (meth)acrylate, and behenyl (meth)acrylate.

In formula (A) above, $R^2$ is preferably an alkyl group having 18 to 34 carbon atoms, more preferably an alkyl group having 18 to 30 carbon atoms, still more preferably an alkyl group having 18 or 22 carbon atoms. $R^2$ is preferably a linear alkyl group. $R^1$ is preferably hydrogen.

The polymerizable monomer A may be a single polymerizable monomer A or a combination of two or more polymerizable monomers A. The monomer unit A may be a single monomer unit A or a combination of two or more monomer units A.

For the toner to have both low-temperature fixability and heat-resistant storage stability and to be less likely to soil a fixing device, a content of the monomer unit A with respect to a content of the vinyl polymer A is preferably 30.0 mass % to 99.9 mass %.

When the content of the monomer unit A in the vinyl polymer A is 30.0 mass % or more, the monomer units A are readily gathered (formed into a block) to provide a crystalline portion, thus increasing the crystallinity of the vinyl polymer A. Thus, the content of the monomer unit A in the vinyl polymer A is preferably 30.0 mass % or more, more preferably 40.0 mass % or more, still more preferably 45.0 mass % or more. When the content of the monomer unit A in the vinyl polymer A is 99.9 mass % or less, the crystallinity of the matrix in the domain-matrix structure is less likely to be excessive, and frictional resistance that occurs at the interface between the domain and the matrix is less likely to be high. As a result, the value of tan δ (Max) is less likely to be high, and the toner is less likely to soil a fixing device. Thus, the content of the monomer unit A in the vinyl polymer A is preferably 99.9 mass % or less, more preferably 85.0 mass % or less, still more preferably 75.0 mass % or less.

When the vinyl polymer A contains two or more monomer units A, the content of the monomer units A in the vinyl polymer A refers to the total content thereof.

A content of the vinyl polymer A with respect to a content of the resin component is preferably 20.0 mass % to 95.0 mass %. When the content of the vinyl polymer A in the resin component is 20.0 mass % or more, it means that a sufficient amount of the vinyl polymer A is contained in the resin component, and both low-temperature fixability and heat-resistant storage stability are readily achieved. Thus, the content of the vinyl polymer A in the resin component is preferably 20.0 mass % or more, more preferably 30.0 mass % or more. When the content of the vinyl polymer A in the resin component is 95.0 mass % or less, the crystallinity of the matrix in the domain-matrix structure is less likely to be excessive, and frictional resistance that occurs at the interface between the domain and the matrix is less likely to be high. As a result, the value of tan δ (Max) is less likely to be high, and the toner is less likely to soil a fixing device. Thus, the content of the vinyl polymer A in the resin component is preferably 95.0 mass % or less, more preferably 80.0 mass % or less.

Monomer Unit B

The vinyl polymer A preferably further contains a monomer unit B having at least one selected from the group consisting of a carboxy group and a sulfo group. When the monomer unit B having the at least one functional group is contained, the monomer units A are readily gathered (formed into a block) to provide a crystalline portion, thus increasing the crystallinity of the vinyl polymer A. As a result, both high low-temperature fixability and heat-resistant storage stability are readily achieved. In addition, the presence of the monomer unit B will probably make the toner less likely to soil a fixing device. A presumed mechanism thereof will be described below.

Since the vinyl polymer A is a crystalline polymer, it is contained in the matrix of the domain-matrix structure. Due to the presence of a functional group bearing a highly polar and highly acidic proton in the monomer unit B, a portion of the vinyl polymer A in the matrix where the monomer unit B is present tends to be present near the interface between the matrix and the domain through electrostatic interaction. In addition, the highly acidic proton of the monomer unit B tends to approach the domain with relatively high polarity to be present at the interface between the domain and the matrix, thus improving the affinity at the interface. This tends to results in a reduction in frictional resistance at the interface and a decrease in the value of tan δ (Max), thus reducing the likelihood of soiling a fixing device.

The vinyl polymer A containing the monomer unit B can be incorporated as a monomer unit of the vinyl polymer A by performing vinyl polymerization using a corresponding polymerizable monomer (hereinafter also referred to as a polymerizable monomer B).

Specific examples of the polymerizable monomer B having a carboxy group include acrylic acid, aconitic acid, atropic acid, allylmalonic acid, angelic acid, isocrotonic acid, itaconic acid, 10-undecene acid, elaidic acid, erucic acid, oleic acid, o-carboxycinnamic acid, crotonic acid, chloroacrylic acid, chloroisocrotonic acid, chlorocrotonic acid, chlorofumaric acid, chloromaleic acid, cinnamic acid, cyclohexenedicarboxylic acid, citraconic acid, hydroxycinnamic acid, dihydroxycinnamic acid, tiglic acid, nitrocinnamic acid, vinylacetic acid, phenylcinnamic acid, 4-phenyl-3-butene acid, ferulic acid, fumaric acid, brassidic acid, 2-(2-furyl)acrylic acid, bromocinnamic acid, bromofumaric acid, bromomaleic acid, benzylidenemalonic acid, benzoylacrylic acid, 4-pentene acid, maleic acid, mesaconic acid, methacrylic acid, methylcinnamic acid, and methoxycinnamic acid. Of these, acrylic acid, methacrylic acid, maleic acid, fumaric acid, etc. are more preferred for ease of reaction.

Specific examples of the polymerizable monomer having a sulfo group include styrenesulfonic acid, vinylsulfonic acid, and 2-acrylamido-2-methylpropanesulfonic acid.

A content of the monomer unit B with respect to a content of the vinyl polymer A is preferably 0.5 mass % to 30.0 mass %. When the content of the monomer unit B in the vinyl polymer A is 0.5 mass % or more, the above-described effects, that is, high low-temperature fixability and heat-resistant storage stability, are readily achieved, and the toner tends to be less likely to soil a fixing device. Thus, the content of the monomer unit B in the vinyl polymer A is preferably 0.5 mass % or more, more preferably 0.8 mass % or more, still more preferably 1.0 mass % or more. When the content of the monomer unit B in the vinyl polymer A is 30.0 mass % or less, the crystallinity of the vinyl polymer A is less likely to decrease, and both low-temperature fixability and heat-resistant storage stability are readily achieved. Thus, the content of the monomer unit B in the vinyl polymer A is preferably 30.0 mass % or less, more preferably 25.0 mass %, still more preferably 10.0 mass % or less.

The molecular weight of the polymerizable monomer B is preferably 1000 or less. The molecular weight of the polymerizable monomer B can be determined using a known technique such as mass spectrometry.

When the solubility parameter (SP) value of the amorphous resin used in producing the resin component is $SP_P$ $(J/cm^3)^{0.5}$, and the SP value of the monomer unit B is $SP_B$ $(J/cm^3)^{0.5}$, inequality (4) below is preferably satisfied.

$$|SP_P - SP_B \leq 5.0 \quad (4)$$

When inequality (4) above is satisfied, the difference in polarity between the amorphous resin used in producing the resin component and the vinyl polymer A tends to be kept appropriate, and the toner tends to be less likely to soil a fixing device. The lower limit is not particularly limited. That is, the lower limit is preferably 0.0 or more. The present inventors presume the mechanism by which these effects are produced as follows.

When inequality (4) above is satisfied, of the monomer units constituting the vinyl polymer A, the monomer unit B having a high SP value tends to have higher affinity for the amorphous resin than monomer units having low SP values, such as the monomer unit A. Since the domains contain the amorphous resin, the monomer unit B constituting a part of the vinyl polymer A tends to be present near the interface between the domain and the matrix, and the highly acidic proton of the monomer unit B tends to reduce frictional resistance that occurs at the interface. As a result, the toner tends to have a low loss elastic modulus and tends to be less likely to soil a fixing device.

Monomer Unit C

The vinyl polymer A preferably further contains at least one monomer unit C selected from the group consisting of a monomer unit represented by formula (B) below and a monomer unit represented by formula (C) below. When the vinyl polymer A contains the monomer unit C, the toner tends to have improved elasticity and is less likely to soil a fixing device.

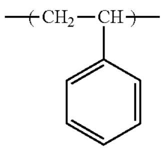

(B)

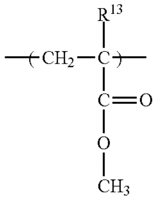

(C)

(In formula (C), $R^{13}$ represents H or $CH_3$.)

The vinyl polymer A containing the monomer unit C can be incorporated as a monomer unit of the vinyl polymer A by performing vinyl polymerization using a corresponding polymerizable monomer (hereinafter also referred to as a polymerizable monomer C).

Examples of the polymerizable monomer C include styrene, methyl methacrylate, and methyl acrylate.

Of these polymerizable monomers C, styrene is preferred from the viewpoint of low-temperature fixability, heat-resistant storage stability, and the unlikelihood of soiling of a fixing device. That is, the monomer unit C is preferably the monomer unit represented by formula (B) above.

A content of the monomer unit C with respect to a content of the vinyl polymer A is preferably 10.0 mass % to 40.0 mass %. When the content of the monomer unit C in the vinyl polymer A is 10.0 mass % or more, the toner tends to have improved elasticity and thus is less likely to soil a fixing device, and the toner tends to have high high-temperature offset resistance. Thus, the content of the monomer unit C in the vinyl polymer A is preferably 10.0 mass % or more, more preferably 15.0 mass % or more. When the content of the monomer unit C in the vinyl polymer A is 40.0 mass % or less, the crystallinity of the vinyl polymer A is less likely to decrease, and both low-temperature fixability and heat-resistant storage stability are readily achieved. Thus, the content of the monomer unit C in the vinyl polymer A is preferably 40.0 mass % or less, more preferably 30.0 mass %.

Monomer Unit D

To be less likely to soil a fixing device and readily provide low-temperature fixability and heat-resistant storage stability, the vinyl polymer A may be a polymer further containing a monomer unit derived from a polymerizable monomer D given below (hereinafter, when the polymerizable monomer D serves as a monomer unit constituting the vinyl polymer A, the monomer unit is also referred to as a monomer unit D). Since the polarity of the polymerizable monomer D given below is different to some degree from the polarity of the polymerizable monomer A, the monomer units A tend to gather in the vinyl polymer A, and the crystallinity of the vinyl polymer A tends to increase. As a result, high low-temperature fixability and high heat-resistant storage stability are readily provided. In addition, when the vinyl polymer A is a polymer having a monomer unit derived from the polymerizable monomer D, the glass transition temperature and the elasticity of the vinyl polymer A are readily controlled, and the toner tends to be less likely to soil a fixing device.

Polymerizable monomers D given below can be used, and the polymerizable monomers D have a polymerizable unsaturated group. These polymerizable monomers D may be used alone or in combination of two or more.

Polymerizable monomers D having a cyano group, such as acrylonitrile and methacrylonitrile.

Polymerizable monomers D having a hydroxy group, such as 2-hydroxyethyl (meth)acrylate and 2-hydroxypropyl (meth)acrylate.

Polymerizable monomers D having an amide bond, such as acrylamide and monomers obtained by reacting amines having 1 to 30 carbon atoms with carboxylic acids having an ethylenically unsaturated bond and 2 to 30 carbon atoms (e.g., acrylic acid and methacrylic acid) in any known manner.

Polymerizable monomers D having a urethane bond, such as monomers obtained by reacting alcohols having an ethylenically unsaturated bond and 2 to 22 carbon atoms (e.g., 2-hydroxyethyl methacrylate and vinyl alcohol) with isocyanates having 1 to 30 carbon atoms [e.g., monoisocyanate compounds (e.g., benzenesulfonyl isocyanate, tosyl isocyanate, phenyl isocyanate, p-chlorophenyl isocyanate, butyl isocyanate, hexyl isocyanate, t-butyl isocyanate, cyclohexyl isocyanate, octyl isocyanate, 2-ethylhexyl isocyanate, dodecyl isocyanate, adamantyl isocyanate, 2,6-dimethylphenyl isocyanate, 3,5-dimethylphenyl isocyanate, and 2,6-dipropylphenyl isocyanate), aliphatic diisocyanate compounds (e.g., trimethylene diisocyanate, tetramethylene diisocyanate, hexamethylene diisocyanate, pentamethylene diisocyanate, 1,2-propylene diisocyanate, 1,3-butylene diisocyanate, dodecamethylene diisocyanate, and 2,4,4-trimethylhexamethylene diisocyanate), alicyclic diisocyanate compounds (e.g., 1,3-cyclopentene diisocyanate, 1,3-cyclohexane diisocyanate, 1,4-cyclohexane diisocyanate, isophorone diisocyanate, hydrogenated diphenylmethane diisocyanate, hydrogenated xylylene diisocyanate, hydrogenated tolylene diisocyanate, and hydrogenated tetramethylxylylene diisocyanate), and aromatic diisocyanate compounds (e.g., phenylene diisocyanate, 2,4-tolylene diisocyanate, 2,6-tolylene diisocyanate, 2,2'-diphenylmethane diisocyanate, 4,4'-diphenylmethane diisocyanate, 4,4'-toluidine diisocyanate, 4,4'-diphenyl ether diisocyanate, 4,4'-diphenyl diisocyanate, 1,5-naphthalene diisocyanate, and xylylene diisocyanate)] in any known manner; and monomers obtained by reacting alcohols having 1 to 26 carbon atoms (e.g., methanol, ethanol, propanol, isopropyl alcohol, butanol, t-butyl alcohol, pentanol, heptanol, octanol, 2-ethylhexanol, nonanol, decanol, undecyl alcohol, lauryl alcohol, dodecyl alcohol, myristyl alcohol, pentadecyl alcohol, cetanol, heptadecanol, stearyl alcohol, isostearyl alcohol, elaidyl alcohol, oleyl alcohol, linoleyl alcohol, linolenyl alcohol, nonadecyl alcohol, heneicosanol, behenyl alcohol, and erucyl alcohol) with isocyanates having an ethylenically unsaturated bond and 2 to 30 carbon atoms [e.g., 2-isocyanatoethyl (meth)acrylate, 2-(0-[1'-methylpropylideneamino]carboxyamino)ethyl (meth)acrylate, 2-[(3,5-dimethylpyrazolyl)carbonylamino]ethyl (meth)acrylate, and 1,1-(bis(meth)acryloyloxymethyl)ethyl isocyanate] in any known manner.

Polymerizable monomers D having a urea bond, such as monomers obtained by reacting amines having 3 to 22 carbon atoms [e.g., primary amines (e.g., n-butylamine, t-butylamine, propylamine, and isopropylamine), secondary amines (e.g., di-n-ethylamine, di-n-propylamine, and di-n-butylamine), aniline, and cycloxylamine] with isocyanates having an ethylenically unsaturated bond and 2 to 30 carbon atoms in any known manner.

Vinyl esters such as vinyl acetate, vinyl propionate, vinyl butyrate, vinyl caproate, vinyl caprylate, vinyl caprate, vinyl laurate, vinyl myristate, vinyl palmitate, vinyl stearate, vinyl pivalate, and vinyl octylate are also suitable for use as polymerizable monomers D.

Vinyl esters, which are non-conjugated monomers and tend to properly maintain the reactivity with the first polymerizable monomer, readily improve the crystallinity of the crystalline portion of the polymer A and help achieve both low-temperature fixability and heat-resistant storage stability.

The monomer unit D may be, for example, at least one monomer unit selected from the group consisting of a monomer unit represented by formula (D) below and a monomer unit represented by formula (E) below.

(D)

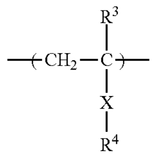

(E)

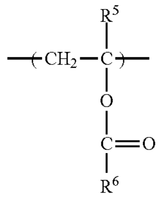

(In formulae (D) and (E), X represents a single bond or an alkylene group having 1 to 6 carbon atoms, $R^4$ represents a cyano group (—C≡N), —C(═O)NHR$^7$ (where $R^7$ is a hydrogen atom or an alkyl group having 1 to 4 carbon atoms), a hydroxy group, —COOR$^8$ (where $R^8$ is an alkyl group having 1 to 6 carbon atoms (preferably 1 to 4 carbon atoms) or a hydroxyalkyl group having 1 to 6 carbon atoms (preferably 1 to 4 carbon atoms)), —NHCOOR$^9$ (where $R^9$ is an alkyl group having 1 to 4 carbon atoms), —NH—C(═O)—NH($R^{10}$)$_2$ (where each $R^{10}$ is independently a hydrogen atom or an alkyl group having 1 to 6 carbon atoms (preferably 1 to 4 carbon atoms)), —COO($CH_2$)$_2$NHCOOR$^{11}$ (where $R^{11}$ is an alkyl group having 1 to 4 carbon atoms), or —COO($CH_2$)$_2$—NH—C(═O)—NH($R^{12}$)$_2$ (where each $R^{12}$ is independently a hydrogen atom or an alkyl group having 1 to 6 carbon atoms (preferably 1 to 4 carbon atoms)), $R^6$ represents an alkyl group having 1 to 4 carbon atoms, and $R^3$ and $R^5$ each independently represent a hydrogen atom or $CH_3$). More preferably, the polymerizable monomer D is at least one selected from the group consisting of acrylonitrile and methacrylonitrile. That is, the monomer unit D is more preferably a monomer unit represented by formula (D) above, where $R_3$ is a hydrogen atom or $CH_3$, X is a single bond, and $R_4$ is a cyano group.

The molecular weight of the polymerizable monomer D is preferably 1000 or less. The molecular weight of the polymerizable monomer D can be determined using a known technique such as mass spectrometry.

A content of the monomer unit D with respect to a content of the vinyl polymer A is preferably 1.0 mass % to 20.0 mass %. When the content of the monomer unit D in the vinyl polymer A is 1.0 mass % or more, the elasticity of the vinyl polymer A is less likely to decrease, thus reducing the likelihood of soiling a fixing device. In addition, the monomer units A are readily gathered (formed into a block) to provide a crystalline portion, thus providing high low-temperature fixability and heat-resistant storage stability. Thus, the content of the monomer unit D in the vinyl polymer A is preferably 1.0 mass % or more, more preferably 10.0 mass % or more. When the content of the monomer unit D in the vinyl polymer A is 20.0 mass % or less, the crystallinity of the vinyl polymer A is less likely to decrease, and both low-temperature fixability and heat-resistant storage stability are readily achieved. Thus, the content of the monomer unit D in the vinyl polymer A is preferably 20.0 mass % or less, more preferably 15.0 mass % or less.

The vinyl polymer A can be produced, for example, by performing vinyl polymerization of a monomer composition containing the polymerizable monomers A, B, C, and D. The vinyl polymer A can be synthesized by a solution polymerization method involving reacting the polymerizable monomers together with a radical reaction initiator in a solvent (e.g., toluene).

Amorphous Polyester

The amorphous resin used in the production is preferably an amorphous polyester. Polyester is a condensation polymer of an alcohol component and a carboxylic acid component.

Examples of the alcohol component of the amorphous polyester include the following polyhydric alcohol components.

Alkylene oxide adducts of bisphenol A, ethylene glycol, diethylene glycol, triethylene glycol, 1,2-propanediol, 1,3-propanediol, 1,4-butanediol, neopentyl glycol, 1,4-butene diol, 1,5-pentanediol, 1,6-hexanediol, 1,4-cyclohexanedimethanol, dipropylene glycol, polyethylene glycol, polypropylene glycol, polytetramethylene glycol, sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, and 1,3,5-trihydroxymethylbenzene.

Examples of the carboxylic acid component of the amorphous polyester include the following unsaturated carboxylic acids and saturated carboxylic acids. Examples of the unsaturated carboxylic acid include unsaturated monocarboxylic acids, unsaturated dicarboxylic acids, unsaturated polycarboxylic acids, anhydrides thereof, and lower alkyl esters thereof.

Examples of the unsaturated monocarboxylic acids include unsaturated monocarboxylic acids having 2 to 80 carbon atoms, and specific examples include acrylic acid, methacrylic acid, propiolic acid, 2-butene acid, crotonic acid, isocrotonic acid, 3-butene acid, angelic acid, tiglic acid, 4-pentene acid, 2-ethyl-2-butene acid, 10-undecene acid, 2,4-hexadiene acid, myristoyleic acid, palmitoleic acid, sapienic acid, oleic acid, elaidic acid, vaccenic acid, gadoleic acid, erucic acid, and nervonic acid.

Examples of the unsaturated dicarboxylic acids include alkenedicarboxylic acids having 4 to 50 carbon atoms, and specific examples include alkenylsuccinic acids such as dodecenylsuccinic acid, maleic acid, fumaric acid, citraconic acid, mesaconic acid, itaconic acid, and glutaconic acid.

Examples of the unsaturated polycarboxylic acids include vinyl polymers (number-average molecular weight Mn determined by gel permeation chromatography (GPC): 450 to 10000) of unsaturated carboxylic acids.

Of the above unsaturated carboxylic acids, acrylic acid, methacrylic acid, alkenylsuccinic acids such as dodecenylsuccinic acid, maleic acid, fumaric acid, and combinations thereof are preferred to achieve both low-temperature fixability and high-temperature offset resistance. Acrylic acid, methacrylic acid, maleic acid, fumaric acid, and combinations thereof are more preferred. Anhydrides and lower alkyl esters of these unsaturated carboxylic acids may also be used.

Examples of the above saturated carboxylic acids include aliphatic carboxylic acids having 2 to 50 carbon atoms (e.g., stearic acid and behenic acid), aromatic carboxylic acids having 7 to 37 carbon atoms (e.g., benzoic acid), alkanedicarboxylic acids having 2 to 50 carbon atoms (e.g., oxalic acid, malonic acid, succinic acid, adipic acid, lepargylic acid, and sebacic acid), aromatic dicarboxylic acids having 8 to 86 carbon atoms (e.g., phthalic acid, isophthalic acid, terephthalic acid, and naphthalenedicarboxylic acid), aromatic polycarboxylic acids having 9 to 20 carbon atoms (e.g., trimellitic acid and pyromellitic acid), and aliphatic tricarboxylic acids having 6 to 36 carbon atoms (e.g., hexanetricarboxylic acid).

Anhydrides and lower (C1 to C4) alkyl esters (e.g., methyl ester, ethyl ester, and isopropyl ester) of the above saturated carboxylic acids may also be used.

Of the above saturated carboxylic acids, aromatic carboxylic acids having 7 to 87 carbon atoms, alkanedicarboxylic acids having 2 to 50 carbon atoms, aromatic dicarboxylic acids having 8 to 20 carbon atoms, and aromatic polycarboxylic acids having 9 to 20 carbon atoms are preferred. When the above saturated carboxylic acids are used, high low-temperature fixability, high-temperature offset resistance, and heat-resistant storage stability are readily provided. From the viewpoint of heat-resistant storage stability and chargeability, benzoic acid, adipic acid, alkylsuccinic acid, terephthalic acid, isophthalic acid, trimellitic acid, pyromellitic acid, and combinations thereof are more preferred. Adipic acid, terephthalic acid, trimellitic acid, and combinations thereof are still more preferred. Anhydrides and lower alkyl esters of these acids may also be used.

The crystalline resin and the amorphous resin used in the production may be unbonded or partially bonded to each other, and are preferably partially bonded to each other for ease of formation of a domain-matrix structure having low interfacial frictional resistance and ease of control of tan δ (Max). For these purposes, the amorphous resin preferably has a carbon-carbon double bond. When the crystalline resin and the amorphous resin are partially bonded to each other, a resin that does not readily mix with the crystalline resin is introduced into the resin component, and the above-described domain-matrix structure is readily formed. In addition, the resin tends to be compatible with both the domains and the matrix of the above-described domain-matrix structure. This helps reduce frictional resistance at the interface between the domain and the matrix, thus reducing the likelihood of soiling a fixing device.

The polyester having a carbon-carbon double bond may be produced by any method. The polyester is preferably obtained by condensation polymerization of constituent components including one or more unsaturated carboxylic acid components and/or unsaturated alcohol components.

A non-linear amorphous polyester can be produced, for example, by performing condensation polymerization of an unsaturated carboxylic acid component and/or an unsaturated alcohol component, and, in addition, a trihydric or higher polyol component that is a saturated alcohol component. The non-linear amorphous polyester can be produced also by performing condensation polymerization of components including a tricarboxylic or higher polycarboxylic acid component that is a saturated carboxylic acid component.

The condensation polymerization reaction of an alcohol component and a carboxylic acid component is performed in an inert gas (e.g., nitrogen gas) atmosphere at a reaction temperature of preferably 150° C. to 280° C., more preferably 160° C. to 250° C., still more preferably 170° C. to 235° C. When the condensation polymerization reaction is performed at a reaction temperature in this range, the constituent components can be sufficiently reacted together. To reliably perform the condensation polymerization reaction, the reaction time is preferably 30 minutes or more, more preferably 2 to 40 hours.

Furthermore, an esterification catalyst can be used as required.

Examples of the esterification catalyst include tin-containing catalysts (e.g., dibutyl tin oxide), antimony dioxide, titanium-containing catalysts (e.g., titanium alkoxide, potassium titanate oxalate, titanium terephthalate, titanium terephthalate alkoxide, titanium dihydroxybis(triethanolaminate), titanium monohydroxytris(triethanolaminate), titanyl bis(triethanolaminate), intramolecular condensation polymerization products thereof, titanium tributoxy terephthalate, titanium triisopropoxy terephthalate, and titanium diisopropoxy diterephthalate), zirconium-containing catalysts (e.g., zirconyl acetate), and zinc acetate.

Of these, titanium-containing catalysts are preferred. Reducing pressure in order to improve the reaction rate at the final stage of the reaction is also effective.

A stabilizer may be added for the purpose of providing polymerization stability. Examples of the stabilizer include hydroquinone, methylhydroquinone, and hindered phenol compounds.

THF Insoluble Matter

The resin component preferably contains tetrahydrofuran insoluble matter (THF insoluble matter). In general, a resin insoluble in THF has higher elasticity than a resin soluble in THF, and thus tends to provide a toner that has a decreased loss tangent and is less likely to soil a fixing device. Examples of the resin insoluble in THF include resins having a cross-linked structure. A content of the THF insoluble matter with respect to a content of the resin component is preferably 5.0 mass % to 80.0 mass %. When the content of the THF insoluble matter in the resin component is 5.0 mass % or more, the toner tends to have increased elasticity, and thus has a low tan δ (Max) and is less likely to soil a fixing device. Thus, the content of the THF insoluble matter in the resin component is preferably 5.0 mass % or more, more preferably 20.0 mass % or more, still more preferably 30.0 mass % or more. When the content of the THF insoluble matter in the resin component is 80.0 mass % or less, the crystallinity of the toner is less likely to decrease, and the elasticity of the toner is less likely to be excessive, thus providing high low-temperature fixability and durability. Thus, the content of the THF insoluble matter in the resin component is preferably 80.0 mass % or less, more preferably 70.0 mass % or less, still more preferably 67.0 mass % or less.

The THF insoluble matter preferably contains a cross-linked resin in which a crystalline resin and an amorphous resin are bonded together. The presence of such a cross-linked resin helps provide a toner that has high low-temperature fixability and is less likely to soil a fixing device (hereinafter, the crystalline resin used in the production is referred to as a crystalline resin A, the amorphous resin used in the production is referred to as an amorphous resin B, and the resin in which the crystalline resin A and the amorphous resin B are bonded together is referred to as a cross-linked resin L). The crystalline resin A and the amorphous resin B may be bonded together, for example, by adding a radical initiator to a dissolved or molten mixture of the crystalline resin A and the amorphous resin B or using a cross-linking agent having a functional group that reacts with both the crystalline resin A and the amorphous resin B.

Examples of the radical initiator used in the cross-linking using a radical initiator include, but are not limited to, inorganic peroxides, organic peroxides, and azo compounds. These radical reaction initiators may be used in combination.

When both the crystalline resin A and the amorphous resin B have a carbon-carbon unsaturated bond, the carbon-carbon unsaturated bonds are cleaved, and the crystalline resin A and the amorphous resin B are cross-linked together. Even if one or both of the crystalline resin A and the amorphous resin B do not have a carbon-carbon unsaturated bond, hydrogen atoms bonded to carbon atoms contained in the crystalline resin A and/or the amorphous resin B are abstracted, and the crystalline resin A and the amorphous resin B are cross-linked together. In this case, the radical initiator used is more preferably an organic peroxide having high reactivity in a radical reaction.

The cross-linking agent having a functional group that reacts with both the crystalline resin A and the amorphous resin B in not particularly limited, and a known cross-linking agent can be used. Examples include cross-linking agents having an epoxy group, cross-linking agents having an isocyanate group, cross-linking agents having an oxazoline group, cross-linking agents having a carbodiimide group, cross-linking agents having a hydrazide group, and cross-linking agents having an aziridine group.

In the cross-linking using a cross-linking agent having a functional group that reacts with both the crystalline resin A and the amorphous resin B, both the crystalline resin A and the amorphous resin B need to have a functional group that reacts with the cross-linking agent.

The resin in which the crystalline resin A and the amorphous resin B cross-linked by the above-described method are at least partially bonded together (i.e., the cross-linked resin L in which the crystalline resin A and the amorphous resin B are cross-linked together) can be used to produce the toner.

In producing the toner by melt kneading, a toner particle containing the resin in which the crystalline resin A and the amorphous resin B are bonded together can also be produced by melt-kneading a raw material mixture containing the crystalline resin A and the amorphous resin B in the presence of the above-described radical initiator or cross-linking agent.

The content of the cross-linked resin L can be controlled by the choice of the composition and molecular weight of the crystalline resin A and the amorphous resin B and the degree of bonding of the crystalline resin A and the amorphous resin B in the production of the resin component. The degree of bonding can be controlled by the choice of, for example, the type and amount of the above-described radical reaction initiator and the carbon-carbon double bond content of the amorphous resin B in the production of the resin component.

For example, the cross-linked resin L is preferably a resin obtained by performing a cross-linking reaction by adding a radical reaction initiator while melt-kneading an amorphous polyester resin having a carbon-carbon double bond, serving as the amorphous resin B, and the vinyl polymer A serving as the crystalline resin A.

By producing the cross-linked resin L using the crystalline resin A and the amorphous resin B, the crystalline resin A and the amorphous resin B are at least partially bonded together to form the cross-linked resin L.

Examples of the radical reaction initiator used for the cross-linking reaction include, but are not limited to, inorganic peroxides, organic peroxides, and azo compounds. These radical reaction initiators may be used in combination.

Examples of the inorganic peroxides include, but are not limited to, hydrogen peroxide, ammonium persulfate, potassium persulfate, and sodium persulfate.

Examples of the organic peroxides include, but are not limited to, benzoyl peroxide, di-t-butyl peroxide, t-butylcumyl peroxide, dicumyl peroxide, α,α-bis(t-butylperoxy) diisopropylbenzene, 2,5-dimethyl-2,5-bis(t-butylperoxy) hexane, di-t-hexyl peroxide, 2,5-dimethyl-2,5-di-t-butyl peroxyhexate, acetyl peroxide, isobutyl peroxide, octanoyl peroxide, decanoyl peroxide, lauroyl peroxide, 3,3,5-trimethylhexanoyl peroxide, m-toluyl peroxide, t-butylperoxy isobutyrate, t-butylperoxy neodecanoate, cumylperoxy neodecanoate, t-butylperoxy-2-ethyl hexanoate, t-butylperoxy-3,5,5-trimethyl hexanoate, t-butylperoxy laurate, t-butylperoxy benzoate, t-butylperoxyisopropyl monocarbonate, and t-butylperoxy acetate.

Examples of the azo compounds or diazo compounds include, but are not limited to, 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, and azobisisobutyronitrile.

Of these, organic peroxides are preferred because they have high initiator efficiency and produce no toxic by-products such as cyanides. Furthermore, reaction initiators having high hydrogen abstraction ability are more preferred because cross-linking reactions proceed efficiently with small amounts of reaction initiators. Examples include radical reaction initiators such as t-butylperoxyisopropyl monocarbonate, benzoyl peroxide, di-t-butyl peroxide, t-butylcumyl peroxide, dicumyl peroxide, α,α-bis(t-butylperoxy) diisopropylbenzene, 2,5-dimethyl-2,5-bis(t-butylperoxy) hexane, and di-t-hexyl peroxide.

In the cross-linking by adding a radical initiator to a dissolved or molten mixture of the crystalline resin A and the amorphous resin B, the amount of the radical initiator added is preferably 2.0 parts by mass or more based on 100.0 parts by mass of the total amount of the resin components to be cross-linked. When the amount of the radical initiator added is 2.0 parts by mass or more, the cross-linking reaction between the crystalline resin A and the amorphous resin B are facilitated. Thus, the amount of the radical initiator added is preferably 2.0 parts by mass or more, more preferably 3.0 parts by mass or more, still more preferably 3.5 parts by mass or more. The upper limit is 50.0 parts by mass.

Since the crystalline resin A is preferably the vinyl polymer A, and the cross-linked resin L can be produced through a cross-linking reaction between the crystalline resin A and the amorphous resin B, the cross-linked resin L preferably contains the monomer unit A. The presence of the monomer unit A helps provide high low-temperature fixability and heat-resistant storage stability, as with the vinyl polymer A. The cross-linked resin L preferably further contains the monomer unit B in addition to the monomer unit A. The presence of the monomer unit A in the cross-linked resin L increases the likelihood of being contained in the matrix, and the presence of the monomer unit B reduces the likelihood of soiling a fixing device, as with the vinyl polymer A.

The THF insoluble matter preferably has a distinct endothermic peak in DSC. This means that the THF insoluble matter exhibits crystallinity. In this case, the toner tends to have high low-temperature fixability because the resin contained in the toner is readily plasticized. Such THF insoluble matter can be obtained, for example, by cross-linking resins including a crystalline resin.

The mixing ratio of the crystalline resin A to the amorphous resin B (crystalline resin A/amorphous resin B) is preferably 40/60 to 95/5 in terms of mass fraction. Within this range, the matrix sufficiently contains the crystalline resin A when the domain-matrix structure is formed, and thus high low-temperature fixability is readily provided. In addition, the value of tan δ (Max) tends to satisfy inequality (2) above, and the toner tends to be less likely to soil a fixing device. Thus, the mixing ratio is preferably 40/60 to 95/5 in terms of mass fraction, more preferably 50/50 to 80/20 in terms of mass fraction.

Various Additives

The toner may optionally contain, in addition to the binder resin, one or more known additives selected from colorants, release agents, magnetic materials, charge control agents, fluidizers, and the like. Materials other than the binder resin used in the toner will be specifically described.

Release Agent

To provide releasability at fixing, a release agent may be incorporated in the toner. Examples of the release agent include polyolefin copolymers, polyolefin wax, aliphatic hydrocarbon waxes such as microcrystalline wax, paraffin wax, and Fischer-Tropsch wax, and ester waxes.

The molecular weight of the release agent is preferably 1000 or more. When the molecular weight is 1000 or more, the compatibility with the crystalline portion in the toner is low. Thus, the release agent tends to bleed out on the toner particle surface at the time of fixing, thus improving the releasability. In addition, the crystalline portion and the release agent are incompatible with each other, and thus the crystallinity of the crystalline portion tends to improve.

Here, the molecular weight of the release agent refers to a peak molecular weight (Mp) determined by gel permeation chromatography (GPC). A measurement method will be described later.

The molecular weight of the release agent is preferably 1500 or more. The upper limit is not particularly limited, but to ensure releasability, the upper limit is preferably 10000 or less, more preferably 5000 or less.

Any release agent having a molecular weight of 1000 or more may be used. Examples include the following.

Aliphatic hydrocarbon waxes such as low-molecular-weight polyethylene, low-molecular-weight polypropylene, low-molecular-weight olefin copolymers, Fischer-Tropsch wax, and waxes obtained by oxidation or acid addition of these waxes.

An ester wax composed mainly of a fatty acid ester can also be used. From the viewpoint of molecular weight, the ester wax is preferably a tri- or higher functional ester wax, more preferably a tetra- or higher functional ester wax.

The tri- or higher functional ester wax can be obtained, for example, by condensation of a tri- or higher functional acid and a long-chain linear saturated alcohol or synthesis of a tri- or higher functional alcohol and a long-chain linear saturated fatty acid.

Examples of tri- or higher functional alcohols that can be used to obtain the ester wax include the following, but are not limited thereto. Mixtures of two or more ester waxes may also be used.

Examples include glycerol, trimethylolpropane, erythritol, pentaerythritol, sorbitol, and condensates thereof. Examples of the condensates include glycerol condensates, i.e., so-called polyglycerols such as diglycerol, triglycerol, tetraglycerol, hexaglycerol, and decaglycerol; trimethylolpropane condensates such as ditrimethylolpropane and tristrimethylolpropane; and pentaerythritol condensates such as dipentaerythritol and trispentaerythritol.

Of these, branched structures are preferred, pentaerythritol and dipentaerythritol are more preferred, and dipentaerythritol is particularly preferred.

Long-chain linear saturated fatty acids suitable for use are those represented by general formula $C_nH_{2n+1}COOH$, where n is 5 or more and 28 or less.

Examples of the long-chain linear saturated fatty acids include, but are not limited to, caproic acid, caprylic acid, octylic acid, nonylic acid, decanoic acid, dodecanoic acid, lauric acid, tridecanoic acid, myristic acid, palmitic acid, stearic acid, behenic acid, and mixtures thereof. In terms of the melting point of wax, myristic acid, palmitic acid, stearic acid, and behenic acid are preferred.

Examples of the tri- or higher functional acid include, but are not limited to, trimellitic acid, butanetetracarboxylic acid, and mixtures thereof.

Long-chain linear saturated alcohols suitable for use are those represented by $C_nH_{2n+1}OH$, where n is 5 or more and 28 or less.

Examples of the long-chain linear saturated alcohols include, but are not limited to, capryl alcohol, lauryl alcohol, myristyl alcohol, palmityl alcohol, stearyl alcohol, behenyl alcohol, and mixtures thereof. In terms of the melting point of wax, myristyl alcohol, palmityl alcohol, stearyl alcohol, and behenyl alcohol are preferred.

The release agent preferably has a softening point, as determined using a flow tester, of 50° C. to 170° C. Examples of such release agents include polyolefin waxes, natural waxes, aliphatic alcohols having 30 to 50 carbon atoms, fatty acids having 30 to 50 carbon atoms, and mixtures thereof.

Examples of the polyolefin waxes include (co)polymers [including products obtained by (co)polymerization and thermal degradation-type polyolefins] of olefins (e.g., ethylene, propylene, 1-butene, isobutylene, 1-hexene, 1-dodecene, 1-octadecene, and mixtures thereof); oxides with oxygen and/or ozone of (co)polymers of olefins; maleic acid-modified products of (co)polymers of olefins [e.g., products modified with maleic acid and derivatives thereof (e.g., maleic anhydride, monomethyl maleate, monobutyl maleate, and dimethyl maleate)]; copolymers of olefins and unsaturated carboxylic acids [e.g., (meth)acrylic acid, itaconic acid, and maleic anhydride] and/or unsaturated carboxylic acid alkyl esters [e.g., (meth)acrylic acid alkyl (C1 to C18 alkyl) esters and maleic acid alkyl (C1 to C18 alkyl) esters]; and Sasol Wax.

Examples of the natural waxes include carnauba wax, montan wax, paraffin wax, and rice wax. Examples of the aliphatic alcohols having 30 to 50 carbon atoms include triacontanol. Examples of the fatty acids having 30 to 50 carbon atoms include triacontanecarboxylic acid.

Preferably, the release agent contains an aliphatic hydrocarbon wax. More preferably, the release agent is an aliphatic hydrocarbon wax. The aliphatic hydrocarbon wax has low polarity and thus tends to bleed out of the polymer A at the time of fixing.

The content of the release agent in the toner is preferably 1.0 mass % to 30.0 mass %, more preferably 2.0 mass % to 25.0 mass %. When the content of the release agent in the toner is in this range, the releasability at fixing is readily ensured. When the content of the release agent in the toner is 1.0 mass % or more, the toner has good releasability. When the content of the release agent in the toner is 30.0 mass % or less, the release agent is not readily exposed on the toner surface, thus leading to good heat-resistant storage stability.

The melting point of the release agent is preferably 80° C. to 120° C. When the melting point of the release agent is in this range, the release agent tends to melt and bleed out on the toner particle surface at the time of fixing, and thus tends to exhibit releasability. The melting point of the release agent is more preferably 85° C. or higher and 110° C. or lower. When the melting point is 80° C. or higher, the release agent is not readily exposed on the toner particle surface, thus providing good heat-resistant storage stability. When the melting point is 120° C. or lower, the release agent melts moderately at the time of fixing, thus providing good low-temperature fixability and good offset resistance.

Magnetic Material

Examples of the magnetic materials include the following.

Examples include iron oxides such as magnetite, hematite, and ferrite, metals such as iron, cobalt and nickel, alloys of these metals with metals such as aluminum, cobalt, copper, lead, magnesium, tin, zinc, antimony, bismuth, calcium, manganese, titanium, tungsten, and vanadium, and mixtures thereof.

Colorant

Examples of the colorants will be described below.

Examples of usable black colorants include carbon black, grafted carbon, and colorants prepared using yellow/magenta/cyan colorants shown below to be black. Examples of the yellow colorants include compounds such as condensed azo compounds, isoindolinone compounds, anthraquinone compounds, azo-metal complexes, methine compounds, and allylamide compounds. Examples of the magenta colorants include condensed azo compounds, diketopyrrolopyrrole compounds, anthraquinone, quinacridone compounds, basic dye lake compounds, naphthol compounds, benzimidazolone compounds, thioindigo compounds, and perylene compounds. Examples of the cyan colorants include copper phthalocyanine compounds and derivatives thereof, anthraquinone compounds, and basic dye lake compounds. These colorants can be used alone, as a mixture, and, furthermore, in the state of a solid solution.

Charge Control Agent

A charge control agent may be used for the improvement and stabilization of chargeability. The charge control agent is preferably an organometallic complex or a chelate compound, in which an acid radical or a hydroxy group and a central metal readily interact with each other. Examples thereof include monoazo metal complexes; acetylacetone metal complexes; and metal complexes and metal salts of aromatic hydroxycarboxylic acids or aromatic dicarboxylic acids.

Fluidizer

Examples of the fluidizers include colloidal silica, alumina powder, titanium oxide powder, and calcium carbonate powder.

Method for Producing Toner

The method for producing the toner is not particularly limited, and, for example, a known production method such as pulverization, suspension polymerization, dissolution suspension, emulsion aggregation, or dispersion polymerization can be used. Of these, from the viewpoint of high-temperature offset resistance and the unlikelihood of soiling of a fixing device, pulverization, which can provide higher dispersibility, is preferred. That is, the method for producing the toner preferably includes a step of obtaining a kneaded product by melt-kneading a mixture containing a crystalline resin and an amorphous resin and a step of obtaining a pulverized product by pulverizing the kneaded product.

As described above, from the viewpoint of low-temperature fixability, heat-resistant storage stability, and the unlikelihood of soiling of a fixing device, the method for producing the toner of the present disclosure more preferably includes a step of obtaining a kneaded product by melt-kneading a mixture containing a vinyl polymer A having crystallinity and an amorphous resin, and a step of obtaining a pulverized product by pulverizing the kneaded product, wherein the vinyl polymer A contains a monomer unit A represented by formula (A) above and a monomer unit B having at least one selected from the group consisting of a carboxy group and a sulfo group, and $SP_P$ and $SP_B$ satisfy inequality (4) above, where $SP_P$ $(J/cm^3)^{0.5}$ is an SP value of the amorphous resin, and $SP_B(J/cm^3)^{0.5}$ is an SP value of the monomer unit B.

To be less likely to soil a fixing device and readily provide high low-temperature fixability and heat-resistant storage stability, the above step of obtaining a kneaded product is preferably a step of obtaining a kneaded product by melt-kneading a mixture containing a crystalline resin, an amorphous resin, and a radical initiator.

In the case of production by pulverization, (i) binder resins and magnetic iron oxide particles serving as colorants, which are constituents of the toner, and, optionally, wax, other additives, etc. are thoroughly mixed using a mixer such as a Henschel mixer or a ball mill, (ii) the resulting mixture is melt-kneaded using a thermal kneader such as a twin-screw kneading extruder, a heating roller, a kneader, or an extruder to disperse or dissolve the wax, the colorants, etc. in the resins intermixed with each other, and (iii) after solidification by cooling, pulverization and classification are performed, whereby the toner particles can be obtained.

To control the shape and surface properties of the toner, the method preferably has, after the pulverization or the classification, a surface treatment step of passing the pulverized or classified product through a surface treatment apparatus that continuously applies a mechanical impact force. By controlling the time of the surface treatment step, the surface shape of the toner can be controlled, and the adhesive strength of the toner can be controlled.

Furthermore, if necessary, a desired external additive is thoroughly mixed using a mixer such as a Henschel mixer, whereby the toner can be obtained.

Examples of the mixer includes the following: Henschel Mixer (manufactured by Nippon Coke & Engineering Co., Ltd.); Super Mixer (manufactured by Kawata Mfg. Co., Ltd.); Ribocone (manufactured by Okawara Mfg. Co., Ltd.); Nauta Mixer, Turbulizer, and Cyclomix (manufactured by Hosokawa Micron Corporation); Spiral Pin Mixer (manufactured by Pacific Machinery & Engineering Co., Ltd.); and Loedige Mixer (manufactured by Matsubo Corporation).

Examples of the kneader include the following: KRC Kneader (manufactured by Kurimoto, Ltd.); Buss Ko-Kneader (manufactured by Buss); TEM-type extruders (manufactured by Toshiba Machine Co., Ltd.); TEX twin-screw kneaders (manufactured by Japan Steel Works, LTD.); PCM kneaders (manufactured by Ikegai Corporation); triple roll mills, mixing roll mills, and kneaders (manufactured by Inoue Mfg., Inc.); Kneadex (manufactured by Mitsui Mining Co., Ltd.); MS-type pressure kneaders and Kneader-Ruder (manufactured by Nihon Spindle Manufacturing Co., Ltd.); and Banbury Mixer (manufactured by Kobe Steel, Ltd.).

Examples of pulverizers include the following: Counter Jet Mill, Micron Jet, and Inomizer (manufactured by Hosokawa Micron Corporation); IDS-type mills and PJM jet pulverizers (manufactured by Nippon Pneumatic MFG. Co., Ltd.); Cross Jet Mill (manufactured by Kurimoto, Ltd.); Ulmax (manufactured by Nisso Engineering Co., Ltd.); SK Jet-O-Mill (manufactured by Seishin Enterprise Co., Ltd.); Kryptron (manufactured by Kawasaki Heavy Industries, Ltd.); Turbo Mill (manufactured by Turbo Corporation); and Super Rotor (manufactured by Nisshin Engineering Inc.).

Examples of classifiers include the following: Classiel, Micron Classifier, and Spedic Classifier (manufactured by Seishin Enterprise Co., Ltd.); Turbo Classifier (manufactured by Nisshin Engineering Inc.); Micron Separator, Turboplex (ATP), and TSP Separator (manufactured by Hosokawa Micron Corporation); Elbow Jet (manufactured by Nittetsu Mining Co., Ltd.); Dispersion Separator (manufactured by Nippon Pneumatic Mfg. Co., Ltd.); and YM Micro Cut (manufactured by Yasukawa Shoji Co., Ltd.).

Examples of surface modification apparatuses include Faculty (manufactured by Hosokawa Micron Corporation), Mechano Fusion (manufactured by Hosokawa Micron Corporation), Nobilta (manufactured by Hosokawa Micron Corporation), Hybridizer (manufactured by Nara Machinery Co., Ltd.), Inomizer (manufactured by Hosokawa Micron Corporation), Theta Composer (manufactured by Tokuju Co., Ltd.), and Mechanomill (manufactured by Okada Seiko Co., Ltd.).

Examples of sieving apparatuses used to sieve coarse particles include the following: Ultrasonic (manufactured by Koeisangyo Co., Ltd.); Resonasieve and Gyro-Sifter (manufactured by Tokuju Co., Ltd.); Vibrasonic System (manufactured by Dalton Corporation); Soniclean (manufactured by Sintokogio, Ltd.); Turbo-Screener (manufactured by Turbo Corporation); Micro Sifter (manufactured by Makino Mfg. Co., Ltd.); and circular vibrating sieves.

Various Measurement Methods, Etc.

Method of Observing Toner Cross-Section Under Transmission Electron Microscope (TEM)

The observation of a domain-matrix structure is performed after a toner particle cross-section is subjected to ruthenium staining.

First, a toner is scattered on a coverslip (Matsunami Glass Ind., Ltd., Square Cover Glass No. 1) so as to form a layer. The toner is then coated with an Os film (5 nm) and a naphthalene film (20 nm) serving as protective films by using an Osmium Plasma Coater (Filgen, Inc., OPC80T). Next, a PTFE tube (Φ1.5 mm×Φ3 mm×3 mm) is filled with a photo-curable resin D800 (JEOL Ltd.), and the coverslip is gently placed on the tube such that the toner is in contact with the photo-curable resin D800. In this state, the resin is cured by irradiation with light, and the coverslip and the tube are then removed to form a cylindrical resin with the toner embedded in its outermost surface. Using an Ultramicrotome (Leica, UC7), cutting is performed from the outermost surface of the cylindrical resin by a length corresponding to the radius of the toner (4.0 μm, in the case where the weight-average particle diameter (D4) is 8.0 μm) at a cutting speed of 0.6 mm/s, to thereby expose a cross-section of the toner. Next, cutting is performed to a thickness of 250 nm to prepare a thin-section sample of the toner cross-section. By performing cutting in this manner, a cross-section of a central part of the toner can be obtained.

The thin-section sample obtained is stained in a 500 Pa atmosphere of $RuO_4$ gas for 15 minutes using a vacuum electron staining apparatus (Filgen, Inc., VSC4R1H), and an STEM observation is performed using a TEM (JEOL Ltd., JEM2800).

The probe size in the STEM observation is 1 nm, and an image having a size of 1024×1024 pixels is acquired.

The bright-field image obtained is subjected to binarization using image processing software "Image-Pro Plus (manufactured by Media Cybernetics Inc.)". In the binarization, the brightness variation from black to white is represented by 0 to 255 grayscale levels, and segments at 127 or lower grayscale level are converted to be black, and segments at 128 or higher grayscale level are converted to be white.

In a cross-sectional observation of a toner particle, a segment containing a crystalline resin is a segment shown as black after the binarization, and a segment containing an amorphous resin is a segment shown as white after the binarization.

Using the binarized STEM image, whether a domain-matrix structure is observed in the cross-section of the toner particle is determined. In addition, whether the domains and the matrix each contain a crystalline resin or an amorphous resin is determined.

Principle of Ruthenium Staining

When a cross-section of a toner particle is subjected to ruthenium staining, a crystalline resin component is more strongly stained with ruthenium than an amorphous resin component to make a clear contrast, thus facilitating the observation of the toner particle cross-section. This is because $RuO_4$ has strong oxidation power and oxidizes long-chain alkyl and alkylene, which increase the crystallinity, and as a result, the crystalline resin component is more strongly stained than the amorphous resin component.

The higher the crystallinity of the resin component, the larger the amount of ruthenium atoms present, and the larger the amount of ruthenium atoms present, the less electron beams are transmitted; therefore, the resin component having higher crystallinity is observed so as to be more strongly stained in an electron microscope image. In contrast, the amorphous resin component is observed so as to be weakly stained or unstained. From this, it can be determined that the strongly stained segment is a segment containing a crystalline resin, and the weakly stained or unstained segment is a segment containing an amorphous resin.

Method of Analyzing Matrix and Domains in Cross-Sectional Observation of Toner

First, thin sections serving as standard samples of the existing amount are prepared.

The crystalline resin A is sufficiently dispersed in a visible light curing resin (Aronix LCR series D800) and then cured by irradiation with short-wavelength light. The resulting cured product is cut with an ultramicrotome equipped with a diamond knife to prepare a 250 nm thin-section sample. Likewise, a thin-section sample of the amorphous resin B is prepared.

Furthermore, the crystalline resin A and the amorphous resin B are mixed in mass ratios 0/100, 30/70, 70/30, and 100/0 and melt-kneaded to prepare kneaded products. These kneaded products are also each dispersed in a visible light curing resin, cured, and then cut to prepare thin-section samples.

Subsequently, cross-sections of the cut samples, i.e., the standard samples, are observed using a transmission electron microscope (electron microscope JEM-2800 manufactured by JEOL Ltd.) (TEM-EDX), and elemental mapping is performed using EDX. The elements to be mapped are carbon, oxygen, and nitrogen.

The mapping conditions are as follows: acceleration voltage, 200 kV; electron beam irradiation size, 1.5 nm; live time limit, 600 sec; dead time, 20 to 30; mapping resolution, 256×256.

On the basis of spectral intensities (average in an area of 10 nm square) of the elements, (oxygen element intensity/carbon element intensity) and (nitrogen element intensity/carbon element intensity) are calculated, and calibration curves with respect to the mass ratio of the crystalline resin A to the amorphous resin B are constructed. In the case where the monomer unit of the crystalline resin A contains nitrogen atoms, the calibration curve of (nitrogen element intensity/carbon element intensity) is used to perform subsequent quantification.

Next, a toner sample is analyzed. The toner is sufficiently dispersed in a visible light curing resin (Aronix LCR series D800) and then cured by irradiation with short-wavelength light. The resulting cured product is cut with an ultramicrotome equipped with a diamond knife to prepare a 250 nm thin-section sample. Subsequently, the cut sample is observed using a transmission electron microscope (electron microscope JEM-2800 manufactured by JEOL Ltd.) (TEM-EDX). Across-sectional image of the toner particle is acquired, and elemental mapping is performed using EDX. The elements to be mapped are carbon, oxygen, and nitrogen.

The toner cross-section to be observed is selected as described below. First, the cross-sectional area of a toner is determined from a toner cross-sectional image, and the diameter of a circle having an area equal to the cross-sectional area (circle-equivalent diameter) is determined. Only a cross-sectional image of a toner having a weight-average particle diameter (D4) that differs from the circle-equivalent diameter by 1.0 μm or less in terms of absolute value is observed.

For the domains and the matrix observed in the observation image, (oxygen element intensity/carbon element intensity) and/or (nitrogen element intensity/carbon element intensity) are calculated on the basis of spectral intensities (average in 10 nm square) of the elements. The ratio of the crystalline resin A to the amorphous resin B can be determined by comparing the calculation results with the above calibration curves.

Method of Measuring Maximum Endothermic Peak Temperature

The measurement of an endothermic peak temperature is performed using a DSC Q1000 (manufactured by TA Instruments) under the following conditions: ramp rate, 10° C./min; measurement start temperature, 20° C.; measurement end temperature, 180° C. For the temperature correction of a detecting unit of an apparatus, the melting points of indium and zinc are used. For the correction of heat quantity, the melting heat of indium is used.

Specifically, a sample of about 5 mg is accurately weighed and placed in an aluminum pan, and differential scanning calorimetry is performed. An empty silver pan is used as a reference.

In the measurement, the temperature is raised once to 180° C. (first heating process), the temperature is then decreased to 20° C., and after this, the temperature is raised again (second heating process). In a DSC curve obtained in the second heating process, the peak top temperature (Tm) of a maximum endothermic peak in the temperature range of from 20° C. to 180° C. is determined.

The maximum endothermic peak refers to a peak having a maximum endothermic value in the range of from 20° C. to 180° C.

The reason why the above measurement is not performed in the first heating process is that a resin or the like produced through a production process including a step of performing a heat treatment may exhibit behavior due to the heat treatment (e.g., an endothermic peak due to relaxation of the resin) during a first heating process in DSC. This behavior may coincide with the inherent behavior of the sample, thus making it difficult to perform an accurate measurement.

However, it is known that the first heating process uniformizes such behavior, and in the second heating process performed after the temperature of the sample is decreased, the behavior due to the heat treatment disappears or becomes less pronounced. Thus, in the present disclosure, the above measurement is performed in the second heating process in order to measure the inherent behavior of the sample.

Method of Measuring Storage Elastic Modulus (G')

As a measuring apparatus, a rotational plate rheometer "ARES" (manufactured by TA Instruments) is used. As a sample, a sample obtained by pressure-forming a toner into a disk shape having a diameter of 8.0 mm and a thickness of 2.0±0.3 mm in an environment at 25° C. by using a tablet machine is used.

The sample is placed between parallel plates, and the temperature is raised from room temperature (25° C.) to 55° C. over 15 minutes to adjust the shape of the sample. The temperature is then decreased to a temperature at which the measurement of viscoelasticity is started, and the measurement is started. At this time, the sample is set such that the initial normal force is 0. In the subsequent measurement, the influence of normal force can be canceled by turning the automatic tension adjustment on, as described below. The measurement is performed under the following conditions. (1) Parallel plates having a diameter of 7.9 mm are used. (2) The frequency is set to 6.28 rad/sec (1.0 Hz). (3) The initial value of applied strain is set to 0.1%. (4) From 30° C. to 200° C., the measurement is performed at a ramp rate of 2.0° C./min. The measurement is performed under the following setting conditions of the automatic adjustment mode. The measurement is performed in the automatic strain adjustment mode. (5) The maximum applied strain is set to 20.0%. (6) The maximum allowed torque is set to 200.0 g·cm, and the minimum allowed torque is set to 0.2 g·cm. (7) The strain adjustment is set to 20.0% of current strain. In the measurement, the automatic tension adjustment mode is employed. (8) The automatic tension direction is set to the compression. (9) The initial static force is set to 10.0 g, and the automatic tension sensitivity is set to 40.0 g. (10) The automatic tension operates at a sample modulus of $1.0\times10^3$ Pa or more.

Method of Measuring Tan δ

The measurement of tan δ is performed using a viscoelasticity measuring apparatus (rheometer) ARES (manufactured by Rheometric Scientific). Measurement fixture: torsion rectangular. Measurement sample: from a toner, a rectangular parallelepiped sample having a width of about 12 mm, a height of about 20 mm, and a thickness of about 2.5 mm is prepared using a pressure-forming machine (held at 15 kN for one minute at normal temperature). The pressure-forming machine used is 100 kN Press NT-1OOH manufactured by NPa System Co., Ltd.

After the fixture and the sample are left to stand for one hour at normal temperature (23° C.), the sample is attached to the fixture. The sample is fixed such that a portion with a width of about 12 mm, a thickness of about 2.5 mm, and a height of 10.0 mm is measured. After the temperature is adjusted to a measurement start temperature of 30° C. over 10 minutes, the measurement is performed under the following setting conditions: measurement frequency, 6.28 rad/s; setting of measurement strain, the initial value is set to 0.1%, and the measurement is performed in the automatic measurement mode; correction of sample elongation, the adjustment is performed in the automatic measurement mode; measurement temperature, the temperature is raised at a rate of 2° C./min from 30° C. to 180° C.; and measurement interval, viscoelasticity data are measured at 30-second intervals, that is, 1° C. intervals.

The data are transferred through an interface to an RSI Orchestrator (control, data collection, and analysis software) (manufactured by Rheometrics Scientific) operable on Windows 7 manufactured by Microsoft Corporation. The maximum value of tan δ in data in the range of 30° C. to 150° C. is determined to be tan δ (Max).

Method of Measuring Content of Monomer Units in Resin

The measurement of the content of monomer units in the resin is performed by $^1$H-NMR under the following conditions: measuring apparatus, FT-NMR apparatus JNM-EX400 (manufactured by JEOL Ltd.); measurement frequency, 400 MHz; pulse conditions, 5.0 μs; frequency range, 10500 Hz; number of scans, 64; measurement temperature, 30° C.; and sample, 50 mg of a measurement sample is placed in a sample tube having an inner diameter of 5 mm, deuterochloroform ($CDCl_2$) as a solvent is added, and the resulting mixture is dissolved in a constant-temperature bath at 40° C. to prepare a sample.

When the vinyl polymer A is used as a measurement sample, among peaks attributed to the monomer unit A in a $^1$H-NMR chart obtained, a peak independent of peaks attributed to the constituents of other monomer units is selected, and the integral value S1 of this peak is calculated. When the polymerizable monomer B (hereinafter referred to as the monomer unit B) is contained as a constituent monomer, among peaks attributed to the constituents thereof; a peak independent of peaks attributed to the constituents of other monomer units is selected, and the integral value S2 of this peak is calculated.

When the monomer unit C is contained, among peaks attributed to the constituents thereof, a peak independent of peaks attributed to the constituents of other monomer units is selected, and the integral value S3 of this peak is calculated.

When the polymerizable monomer D (hereinafter referred to as the monomer unit D) is contained as a constituent monomer, among peaks attributed to the constituents thereof, a peak independent of peaks attributed to the constituents of other monomer units is selected, and the integral value S4 of this peak is calculated.

The contents of the monomer units A, B, C, and D are determined as described below using the integral values S1, S2, S3, and S4, n1, n2, n3, and n4 each represent the number of hydrogen atoms in the constituent to which the peak noted is attributed of each unit. M1, M2, M3, and M4 are molecular weights of the monomer units. Content (mol %) of monomer unit A={(S1/n1×M1)/((S1/n1×M1)+(S2/n2×M2)+(S3/n3×M3)+(S4/n4×M4))}×100. Likewise, the contents of the monomer units B, C, and D are determined by the following formulae. Content (mol %) of monomer unit B={(S2/n2×M2)/((S1/n1×M1)+(S2/n2×M2)+(S3/n3×M3)+(S4/n4×M4))}×100. Content (mol %) of monomer unit C={(S3/n3×M3)/((S1/n1×M1)+(S2/n2×M2)+(S3/n3×M3)+(S4/n4×M4))}×100. Content (mol %) of monomer unit D={(S4/n4×M4)/((S1/n1×M1)+(S2/n2×M2)+(S3/n3×M3)+(S4/n4×M4))}×100. When a polymerizable monomer containing no hydrogen atoms is used as a constituent other than vinyl groups in the polymer A, the measurement is performed using $^{13}$C-NMR, in which the nucleus to be measured is $^{13}$C, in the single pulse mode, and calculations are performed in the same manner by $^1$H-NMR.

Method of Calculating SP Value

The SP values are determined as described below in accordance with a calculation method proposed by Fedors.

For an atom or atomic group in a molecular structure to be calculated, an evaporation energy (Δei) (cal/mol) and a molar volume (Δvi) (cm/mol) are determined from a table described in "Polym. Eng. Sci., 14(2), 147-154 (1974)". The SP value $(J/cm^3)^{0.5}$ is calculated by $(4.184\times\Sigma\Delta ei/\Sigma\Delta vi)^{0.5}$.

$SP_P$ is calculated from the constitution of a monomer unit contained in the amorphous resin used in the production. $SP_B$ is calculated on a single monomer basis.

Method of Measuring Content of THF Insoluble Matter in Resin Component

As a measurement sample, 1.5 g of a toner (0.7 g of a resin component, in the case where the resin component alone is used as a measurement sample) is accurately weighed ($W_1$ [g]) and placed in an extraction thimble (trade name: No. 86R, size 28×100 mm, manufactured by Advantec Toyo Kaisha, Ltd.) accurately weighed in advance. The extraction thimble with the toner is put in a Soxhlet extractor.

Extraction is performed for 18 hours using 200 mL of tetrahydrofuran (THF) as a solvent. This extraction is performed at a reflux rate such that one cycle of solvent extraction ends in about five minutes.

After completion of the extraction, the extraction thimble is removed and dried in air, and then dried under vacuum at 40° C. for eight hours. The mass of the extraction thimble including the extraction residue is weighed, and the mass of the extraction thimble is deducted to thereby calculate the mass ($W_2$ [g]) of the extraction residue.

When THF soluble matter is recovered, it can be recovered by thoroughly distilling THF out of the soluble matter in THF with an evaporator.

Next, the content ($W_3$ [g]) of components other than the resin component is determined according to the following procedure (in the following procedure, if the resin component alone is used as a measurement sample, $W_3$ is 0 g).

About 2 g of the toner is accurately weighed ($W_a$ [g]) in a 30 mL magnetic crucible weighed in advance.

The magnetic crucible is placed in an electric furnace, heated at about 900° C. for about three hours, and allowed to cool in the electric furnace. At normal temperature, the magnetic crucible is allowed to cool in a desiccator for one hour or more. The mass of the crucible including incineration residual ash is weighed, and the mass of the crucible is deducted to thereby calculate the mass of the incineration residual ash ($W_b$[g]).

The mass of the incineration residual ash ($W_3$ [g]) in $W_1$ [g] of the sample is calculated by formula (6): $W_3=W_1\times(W_b/W_a)$ . . . (6). The content of THF insoluble matter in the resin component can be calculated by formula (7) using $W_1$, $W_2$, and $W_3$: content ofTHF insoluble matter in resin component (mass %)=$\{(W_2-W_3)/(W_1-W_3)\}\times100$ . . . (7).

EXAMPLES

The present disclosure will be described below more specifically with reference to examples, but these examples are not intended to limit the present disclosure.

Production Example of Crystalline Resin A-1

In a nitrogen atmosphere, the following materials were put into a reaction vessel equipped with a reflux condenser, a stirrer, a thermometer, and a nitrogen inlet tube.

Toluene, 100.0 parts; behenyl acrylate (polymerizable monomer A), 64.0 parts; methacrylic acid (polymerizable monomer B), 3.0 parts; styrene (polymerizable monomer C), 17.0 parts; acrylonitrile (polymerizable monomer D), 16.0 parts; and t-butylperoxy pivalate (Perbutyl PV manufactured by NOF Corporation), 3.0 parts. The materials (monomer compositions) in the reaction vessel were heated to 70° C. with stirring at 200 rpm to perform a polymerization reaction for 12 hours, whereby a solution of a polymer of the monomer compositions in toluene was obtained. Subsequently, the solution is cooled to 25° C. and then poured into 1000.0 parts of methanol with stirring to precipitate methanol insoluble matter. The methanol insoluble matter was separated by filtration, washed with methanol, and then dried under vacuum at 40° C. for 24 hours to obtain a crystalline resin A-1, whose $SP_B$ was 22.0. The polymer A-1 was a crystalline resin exhibiting a distinct endothermic peak in DSC. The physical properties of the polymer A-1 are shown in Table 1.

Production Examples of Crystalline Resins A-2 to A-9

Crystalline resins A-2 to A-9 were obtained in the same manner as the crystalline resin A-1 except that the polymerizable monomers A, B, C, and D used were changed as shown in Table 1. The polymers A-2 to A-9 were each a crystalline resin exhibiting a distinct endothermic peak in DSC. The physical properties of the polymers A-2 to A-9 are shown in Table 1.

TABLE 1

| | Polymerizable monomer A | | Polymerizable monomer B | | | Polymerizable monomer C | | Polymerizable monomer D | |
|---|---|---|---|---|---|---|---|---|---|
| Crystalline resin A Type | Type | Amount (parts by mass) | Type | Amount (parts by mass) | $SP_B$ $(J/cm^3)^{0.5}$ | Type | Amount (parts by mass) | Type | Amount (parts by mass) |
| A-1 | BEA | 64.0 | MA | 3.0 | 22.0 | St | 17.0 | AN | 16.0 |
| A-2 | BEA | 64.0 | MA | 6.0 | 22.0 | St | 18.0 | AN | 13.0 |
| A-3 | BEA | 29.0 | MA | 24.0 | 22.0 | St | 31.0 | AN | 16.0 |
| A-4 | BEA | 98.0 | MA | 0.8 | 22.0 | — | — | AN | 1.2 |
| A-5 | BEA | 64.0 | VSA | 3.0 | 18.9 | St | 17.0 | AN | 16.0 |
| A-6 | STA | 64.0 | MA | 3.0 | 22.0 | St | 17.0 | AN | 16.0 |
| A-7 | MYA | 64.0 | MA | 3.0 | 22.0 | St | 17.0 | AN | 16.0 |
| A-8 | OCA | 64.0 | MA | 3.0 | 22.0 | St | 17.0 | AN | 16.0 |
| A-9 | BEA | 60.0 | — | — | — | St | 20.0 | AN | 20.0 |

Abbreviations in Table 1 are as follows: BEA, behenyl acrylate; STA, stearyl acrylate; MYA, myristyl acrylate; OCA, octacosaacrylate; MA, methacrylic acid; VSA, vinyl sulfonic acid: St, styrene; and AN, acrylonitrile.

Production Example of Amorphous Resin B-1

In a nitrogen atmosphere, the following materials were put into a reaction vessel equipped with a reflux condenser, a stirrer, a thermometer, and a nitrogen inlet tube. Ethylene oxide (2 mol) adduct of bisphenol A, 73.0 parts; terephthalic acid, 23.0 parts; and titanium diisopropoxy bistriethanolaminate, 2.5 parts. Under a stream of nitrogen, these materials were allowed to react at 230° C. for two hours while distilling off the water produced. Next, the reaction was performed under reduced pressure at 2.5 kPa for five hours, and the temperature was then decreased to 180° C. To the reaction product, 1 part of tert-butylcatechol serving as a polymerization inhibitor was added, and 60.0 parts of fumaric acid was further added. The reaction was performed under reduced pressure at 0.5 to 2.5 kPa for eight hours, and the reaction product was then taken out to obtain an amorphous resin B-1. The SP value of the amorphous resin B-1 was calculated by the above-described method. $SP_P$ was 23.3.

Production Example of Binder Resin C-1

The crystalline resin A-1 in an amount of 60 parts and the amorphous resin B-1 in an amount of 40 parts were mixed and fed to a twin-screw kneader (S5KRC kneader manufactured by Kurimoto, Ltd.) at 20 kg/h. Simultaneously with this, 4.0 parts of t-butylperoxyisopropyl monocarbonate serving as a radical reaction initiator were fed at 0.8 kg/h. Kneading extrusion was performed at 80 rpm for 10 minutes at 160° C. to cause a reaction. Furthermore, nitrogen was flowed through a vent port, and mixing was performed while removing an organic solvent. The mixture obtained was cooled to thereby obtain a binder resin C-1.

Production Examples of Binder Resins C-2 to C-18

Binder resins C-2 to C-18 were obtained in the same manner as the binder resin C-1 except that the crystalline resin A, the amorphous resin B, and t-butylperoxyisopropyl monocarbonate used were changed as shown in Table 2.

TABLE 2

| | Crystalline resin A | | Crystalline resin B | | t-Butylperoxyisopropyl |
|---|---|---|---|---|---|
| | Type | Amount (parts by mass) | Type | Amount (parts by mass) | monocarbonate Amount (parts by mass) |
| Binder resin C-1 | A-1 | 60.0 | B-1 | 40.0 | 4.0 |
| Binder resin C-2 | A-2 | 60.0 | B-1 | 40.0 | 4.0 |
| Binder resin C-3 | A-1 | 35.0 | B-1 | 65.0 | 4.0 |
| Binder resin C-4 | A-1 | 40.0 | B-1 | 60.0 | 4.0 |
| Binder resin C-5 | A-1 | 80.0 | B-1 | 20.0 | 4.0 |
| Binder resin C-6 | A-1 | 93.0 | B-1 | 7.0 | 4.0 |
| Binder resin C-7 | A-3 | 80.0 | B-1 | 20.0 | 4.0 |
| Binder resin C-8 | A-4 | 40.0 | B-1 | 60.0 | 4.0 |
| Binder resin C-9 | A-6 | 60.0 | B-1 | 40.0 | 4.0 |
| Binder resin C-10 | A-7 | 60.0 | B-1 | 40.0 | 4.0 |
| Binder resin C-11 | A-8 | 60.0 | B-1 | 40.0 | 4.0 |
| Binder resin C-12 | A-5 | 60.0 | B-1 | 40.0 | 4.0 |
| Binder resin C-13 | A-9 | 60.0 | B-1 | 40.0 | 4.0 |
| Binder resin C-14 | A-9 | 80.0 | B-1 | 20.0 | 4.0 |
| Binder resin C-15 | A-9 | 90.0 | B-1 | 10.0 | 4.0 |
| Binder resin C-16 | A-1 | 100.0 | — | — | 4.0 |

TABLE 2-continued

| | Crystalline resin A | | Crystalline resin B | | t-Butylperoxyisopropyl |
|---|---|---|---|---|---|
| | Type | Amount (parts by mass) | Type | Amount (parts by mass) | monocarbonate Amount (parts by mass) |
| Binder resin C-17 | A-1 | 30.0 | B-1 | 70.0 | 4.0 |
| Binder resin C-18 | A-1 | 30.0 | B-1 | 70.0 | 0.0 |

Production Example of Toner 1

The binder resin C-1 in an amount of 100.0 parts by mass, carbon black (Nipex35 manufactured by Orion Engineered Carbons) in an amount of 5.0 parts by mass, and a release agent (EXCEREX 15341PA manufactured by Mitsui Chemicals, Inc.) in an amount of 5.0 parts by mass were premixed in a Henschel mixer and then melt-kneaded using a twin-screw extruder (trade name: PCM-30, manufactured by Ikegai Corporation) with the temperature being set such that the temperature of melt at a discharge port would be 150° C.

The resulting kneaded product was cooled, coarsely pulverized with a hammer mill, and then finely pulverized using a pulverizer (trade name: Turbo Mill T250, manufactured by Freund-Turbo Corporation). The resulting finely pulverized powder was classified using a multi-division classifier that utilizes the Coanda effect, to obtain a toner particle 1 having a weight-average particle diameter (D4) of 7.2 μm.

To 100.0 parts by mass of the toner particle 1, 1.0 parts by mass of hydrophobic silica fine powder (number-average primary particle diameter: 10 nm) surface-treated with hexamethyldisilazane were added, and mixing was performed at 3200 rpm for two minutes using a Henschel mixer to obtain a toner 1. The physical properties of the toner 1 are shown in Table 3.

TABLE 3

| Toner | Binder | Domain-matrix structure | | Tm | | | G'(−5)/ | tanδ | | THF insoluble matter |
|---|---|---|---|---|---|---|---|---|---|---|
| Type | resin | Matrix | Domains | (° C.) | G'(−5) (Pa) | G'(+5) (Pa) | G'(+5) | (Max) | $\lvert SP_P - SP_B \rvert$ | (mass %) |
| 1 | C-1 | crystalline | amorphous | 59.3 | $2.68 \times 10^7$ | $9.20 \times 10^4$ | 291 | 0.69 | 1.3 | 53 |
| 2 | C-2 | crystalline | amorphous | 60.5 | $2.65 \times 10^7$ | $8.62 \times 10^4$ | 307 | 0.65 | 1.3 | 42 |
| 3 | C-3 | crystalline | amorphous | 58.9 | $3.26 \times 10^7$ | $5.83 \times 10^5$ | 56 | 0.40 | 1.3 | 75 |
| 4 | C-4 | crystalline | amorphous | 59.0 | $3.55 \times 10^7$ | $1.85 \times 10^5$ | 192 | 0.59 | 1.3 | 63 |
| 5 | C-5 | crystalline | amorphous | 60.4 | $2.55 \times 10^7$ | $4.54 \times 10^4$ | 562 | 0.97 | 1.3 | 23 |
| 6 | C-6 | crystalline | amorphous | 61.3 | $2.34 \times 10^7$ | $2.28 \times 10^4$ | 1026 | 1.45 | 1.3 | 8 |
| 7 | C-7 | crystalline | amorphous | 58.4 | $2.80 \times 10^7$ | $3.55 \times 10^5$ | 79 | 0.71 | 1.3 | 27 |
| 8 | C-8 | crystalline | amorphous | 62.9 | $2.96 \times 10^7$ | $8.56 \times 10^4$ | 346 | 0.96 | 1.3 | 63 |
| 9 | C-9 | crystalline | amorphous | 53.6 | $2.78 \times 10^7$ | $8.90 \times 10^4$ | 312 | 0.72 | 1.3 | 52 |
| 10 | C-10 | crystalline | amorphous | 74.6 | $2.67 \times 10^7$ | $9.25 \times 10^4$ | 289 | 0.65 | 1.3 | 52 |
| 11 | C-11 | crystalline | amorphous | 77.8 | $2.56 \times 10^7$ | $9.32 \times 10^4$ | 275 | 0.63 | 1.3 | 51 |
| 12 | C-12 | crystalline | amorphous | 59.6 | $1.89 \times 10^7$ | $8.99 \times 10^4$ | 210 | 0.70 | 18.9 | 55 |
| 13 | C-13 | crystalline | amorphous | 56.3 | $1.04 \times 10^7$ | $4.94 \times 10^5$ | 21 | 0.72 | — | 52 |
| 14 | C-14 | crystalline | amorphous | 56.4 | $4.07 \times 10^6$ | $1.13 \times 10^5$ | 36 | 1.66 | — | 22 |
| 15 | C-15 | crystalline | amorphous | 57.2 | $3.77 \times 10^7$ | $1.03 \times 10^5$ | 366 | 3.54 | — | 11 |
| 16 | C-16 | crystalline | amorphous | 63.1 | $1.28 \times 10^8$ | $1.30 \times 10^4$ | 9846 | 4.96 | 1.3 | 0 |
| 17 | C-17 | amorphous | crystalline | 57.8 | $4.10 \times 10^7$ | $2.56 \times 10^6$ | 16 | 0.38 | 1.3 | 81 |
| 18 | C-18 | amorphous | crystalline | 59.3 | $4.12 \times 10^7$ | $2.94 \times 10^6$ | 14 | 1.76 | 1.3 | 2 |

The physical properties of toners shown in Table 3 were measured by the measurement methods described above.

Production Examples of Toners 2 to 18

Toners 2 to 18 were obtained in the same manner as the toner 1 except that the type of binder resin used was changed as shown in Table 3. The physical properties of the toners 2 to 18 are shown in Table 3.

Example 1

The toner 1 was evaluated in the following manner. The evaluation results are shown in Table 4.

Evaluation of Low-Temperature Fixability of Toner

The evaluation of low-temperature fixability was conducted using, as an image forming apparatus, a modified machine of a color laser printer (HP Color LaserJet 3525dn manufactured by HP Inc.) and a white sheet (Office Planner manufactured by CANON KABUSHIKI KAISHA; 64 $g/m^2$) as an evaluation sheet. The image forming apparatus had been modified in that a fixing temperature and a process speed were made to be changeable and that a fixing unit was made to be detachable.

First, the fixing unit was detached from the image forming apparatus, and toner was removed from a black cartridge. The toner 1 in an amount of 100 g was loaded into the cartridge.

Subsequently, using the toner 1 loaded, an unfixed toner image (toner coverage: 0.9 $mg/cm^2$) 2.0 cm long and 15.0 cm wide was formed on an evaluation sheet at an area 1.0 cm away from the top end in a sheet feeding direction, to obtain an unfixed image.

For the fixation of the unfixed image, an external fixing device modified so as to operate outside a laser beam printer was used. In a normal-temperature and normal-humidity environment (23° C. and 60% RH), the process speed of the external fixing device was set to 410 mm/s, and while successively increasing the set temperature in increments of 5° C. from an initial fixing temperature of 100° C., the unfixed image was fixed at each temperature to obtain a fixed image. For the fixed image, a fixing temperature at which low-temperature offset did not occur was determined to be a lowest fixing temperature, and the value of the lowest fixing temperature was used to evaluate low-temperature fixability. Toners having a lowest fixing temperature of 130° C. or lower were judged as having the advantageous effects of the present disclosure.

Evaluation of Fixing Device Soiling

After the evaluation of low-temperature fixability of the toner was performed, fixing device soiling was evaluated using the image forming apparatus and the evaluation sheet used in the evaluation of low-temperature fixability. In the evaluation of fixing device soiling, to what degree the fixing device was soiled and how much image soiling accompanied the soiling of the fixing device when the toner coverage on the evaluation sheet was increased while maintaining the above lowest fixing temperature were evaluated. Therefore, the fixing temperature at the time of image output was set to the above lowest fixing temperature, and the following image output was performed.

In a normal-temperature and normal-humidity environment (23° C. and 60% RH), the process speed was set to 410 mm/s, and 300 white-image evaluation sheets with a printing ratio of 0% were continuously output. Without a pause, one black-image evaluation sheet on which an image (toner coverage: 1.5 $mg/cm^2$) having a front-edge margin of 5 mm, a width of 100 mm, and a length of 100 mm was formed thereon was output. Thereafter, soiling of the fixing device was checked, and five white-image evaluation sheets with a printing ratio of 0% were output. On the basis of the five white-image evaluation sheets output after the output of the one black-image evaluation sheet and the soiling of the fixing device, fixing device soiling was evaluated according to the following criteria. In the following criteria, A to C were judged as having the advantageous effects of the present disclosure.

A: No soiling is observed in the fixing device, and no image defects are observed in the white-image evaluation sheet. B: Soiling is observed in the fixing device, but no image defects are observed in the white-image evaluation sheet. C: Soiling is observed in the fixing device, and image soiling due to the fixing device soiling is observed in the first white-image evaluation sheet but disappears by the fifth white-image evaluation sheet. D: Soiling is observed in the fixing device, and image soiling due to the fixing device soiling is observed in the first white-image evaluation sheet but becomes minor by the fifth white-image evaluation sheet. E: Soiling is observed in the fixing device, and image soiling due to the fixing device soiling remains without becoming minor from the first to fifth white-image evaluation sheets.

Evaluation of Heat-Resistant Storage Stability

The toner 1 in an amount of 5 g was put in a 50-cc plastic cup and left to stand for 24 hours at a temperature of 50° C. and a humidity of 80% RH. The presence or absence of aggregates of the toner 1 after being left to stand was checked, and heat-resistant storage stability was evaluated according to the following criteria. In the following criteria, A to C were judged as having the advantageous effects of the present disclosure.

A: No aggregates are formed. B: Small aggregates are formed, but are crumbled when lightly pushed with a finger. C: Aggregates are formed, but are crumbled when lightly pushed with a finger. D: Completely aggregated, and not crumbled when strongly pushed with a finger.

Examples 2 to 12

The toners 2 to 12 were evaluated in the same manner as in Example 1. The evaluation results are shown in Table 4.

Comparative Examples 1 to 6

The toners 13 to 18 were evaluated in the same manner as in Example 1. The evaluation results are shown in Table 4.

TABLE 4

| | Toner | Low-temperature fixability | Fixing device soiling | Heat-resistant storage stability |
|---|---|---|---|---|
| Example 1 | toner 1 | 115° C. | A | A |
| Example 2 | toner 2 | 110° C. | A | A |
| Example 3 | toner 3 | 130° C. | A | A |
| Example 4 | toner 4 | 120° C. | A | A |
| Example 5 | toner 5 | 105° C. | B | A |
| Example 6 | toner 6 | 100° C. | C | A |
| Example 7 | toner 7 | 135° C. | A | A |
| Example 8 | toner 8 | 115° C. | C | A |
| Example 9 | toner 9 | 110° C. | A | C |
| Example 10 | toner 10 | 120° C. | A | A |
| Example 11 | toner 11 | 130° C. | A | A |
| Example 12 | toner 12 | 115° C. | A | A |
| Comparative Example 1 | toner 13 | 140° C. | B | A |
| Comparative Example 2 | toner 14 | 130° C. | D | A |

TABLE 4-continued

| | Toner | Low-temperature fixability | Fixing device soiling | Heat-resistant storage stability |
|---|---|---|---|---|
| Comparative Example 3 | toner 15 | 125° C. | E | A |
| Comparative Example 4 | toner 16 | 100° C. | E | A |
| Comparative Example 5 | toner 17 | 155° C. | A | A |
| Comparative Example 6 | toner 18 | 145° C. | D | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2020-168583, filed Oct. 5, 2020, which is hereby incorporated by reference herein in its entirety.

What is claimed is:

1. A toner comprising a toner particle containing a resin component including a crystalline resin and an amorphous resin, wherein in a cross-sectional observation of the toner particle, a domain-matrix structure which comprises a matrix containing the crystalline resin and domains containing the amorphous resin is observed, a maximum endothermic peak temperature Tm (° C.) of the toner determined by differential scanning calorimetry (DSC) is 50° C. to 80° C., G'(−5) and G'(+5) satisfy inequality (1):

$$G'(-5)/G'(+5) \geq 50 \quad (1)$$

where G'(−5) (Pa) is a storage elastic modulus of the toner at a temperature 5° C. lower than Tm (° C.), and G'(+5) (Pa) is a storage elastic modulus of the toner at a temperature 5° C. higher than Tm (° C.), and tan δ (Max) satisfies inequality (2):

$$0.0 \leq \tan\delta(\mathrm{Max}) \leq 1.50 \quad (2)$$

where tan δ (Max) is a maximum loss tangent of the toner in a temperature range of from 50° C. to 130° C., the resin component contains tetrahydrofuran insoluble matter, and a content of the tetrahydrofuran insoluble matter with respect to a content of the resin component is 5.0 mass % to 80.0 mass %, and the tetrahydrofuran insoluble matter contains a cross-linked resin in which the crystalline resin and the amorphous resin are bonded together wherein the crystalline resin is a vinyl polymer A containing a monomer unit A represented by formula (A):

(A)

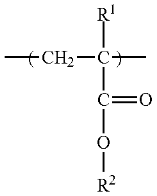

Where, in formula (A), $R^1$ represents H or $CH_3$, and $R^2$ represents an alkyl group having 18 to 36 carbon atoms.

2. The toner according to claim 1, wherein tan δ (Max) satisfies inequality (3): $0.0 \leq \tan\delta\ (\mathrm{Max}) \leq 0.98$ . . . (3).

3. The toner according to claim 1, wherein G'(+5) (Pa) is $1.00 \times 10^4$ Pa to $1.00 \times 10^6$ Pa.

4. The toner according to claim 1, wherein a content of the monomer unit A with respect to a content of the vinyl polymer A is 30.0 mass % to 99.9 mass %.

5. The toner according to claim 4, wherein the vinyl polymer A further contains a monomer unit B, and the monomer unit B has at least one selected from the group consisting of a carboxy group and a sulfo group.

6. The toner according to claim 5, wherein a content of the monomer unit B with respect to a content of the vinyl polymer A is 0.5 mass % to 30.0 mass %.

7. The toner according to claim 5, wherein the vinyl polymer A further contains a monomer unit C, and the monomer unit C is at least one monomer unit selected from the group consisting of a monomer unit represented by formula (B):

(B)

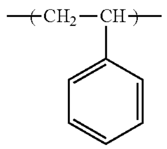

and a monomer unit represented by formula (C):

(C)

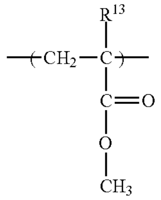

where, in formula (C), $R^{13}$ represents H or $CH_3$.

8. The toner according to claim 5, wherein the vinyl polymer A further contains a monomer unit D, and the monomer unit D is at least one monomer unit selected from the group consisting of a monomer unit represented by formula (D):

(D)

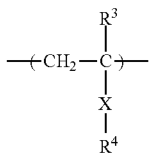

and a monomer unit represented by formula (E):

(E)

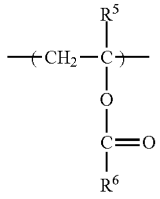

where, in formulae (D) and (E), X represents a single bond or an alkylene group having 1 to 6 carbon atoms, $R^4$ represents a cyano group (—C≡N), —C(═O)NHR$^7$ (where $R^7$ is a hydrogen atom or an alkyl group having 1 to 4 carbon atoms), a hydroxy group, —COOR$^8$ (where $R^8$ is an alkyl group having 1 to 6 carbon atoms or a hydroxyalkyl group having 1 to 6 carbon atoms), —NHCOOR$^9$ (where $R^9$ is an alkyl group having 1 to 4 carbon atoms), —NH—C(═O)—NH($R^{10}$)$_2$ (where each $R^{10}$ is independently a hydrogen atom or an alkyl group having 1 to 6 carbon atoms), —COO($CH_2$)$_2$NHCOOR$^{11}$ (where $R^{11}$ is an alkyl group having 1 to 4 carbon atoms), or —COO($CH_2$)$_2$—NH—C(═O)—NH($R^{12}$)$_2$ (where each $R^{12}$ is independently a hydrogen atom or an alkyl group having 1 to 6 carbon atoms), $R^6$ represents an alkyl group having 1 to 4 carbon atoms, and $R^3$ and $R^5$ each independently represent a hydrogen atom or $CH_3$.

9. A method for producing the toner according to claim 1, the method comprising:

a step of obtaining a kneaded product by melt-kneading a mixture containing vinyl polymer A having crystallinity and an amorphous resin; and a step of obtaining a pulverized product by pulverizing the kneaded product, and a monomer unit B having at least one selected from the group consisting of a carboxy group and a sulfo group, and $SP_P$ and $SP_B$ satisfy inequality (4):

$$|SP_P - SP_B| \leq 5.0 \quad (4)$$

where $SP_P$ (J/cm$^3$)$^{0.5}$ is a solubility parameter (SP) value of the amorphous resin, and $SP_B$ (J/cm$^3$)$^{0.5}$ is an SP value of the monomer unit B.

10. The method for producing the toner according to claim 9, wherein the amorphous resin is polyester.

11. The method for producing the toner according to claim 9, wherein the step of obtaining a kneaded product is a step of obtaining a kneaded product by melt-kneading a mixture further containing a radical initiator, and the amorphous resin has a carbon-carbon double bond.

* * * * *